US012268122B2

(12) United States Patent
Matsuda et al.

(10) Patent No.: US 12,268,122 B2
(45) Date of Patent: Apr. 8, 2025

(54) WORK VEHICLE AND GRASS MOWING MACHINE

(71) Applicant: Kubota Corporation, Osaka (JP)

(72) Inventors: Kazuaki Matsuda, Sakai (JP); Katsuhiko Uemura, Sakai (JP); Yasuhiro Manji, Sakai (JP); Ryo Ikeda, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 18/582,304

(22) Filed: Feb. 20, 2024

(65) Prior Publication Data

US 2024/0188485 A1 Jun. 13, 2024

Related U.S. Application Data

(62) Division of application No. 16/378,697, filed on Apr. 9, 2019, now Pat. No. 11,937,538.

(30) Foreign Application Priority Data

Jun. 21, 2018 (JP) .................................. 2018-118111
Oct. 23, 2018 (JP) .................................. 2018-199330

(51) Int. Cl.
*B60W 60/00* (2020.01)
*A01D 34/00* (2006.01)
(Continued)

(52) U.S. Cl.
CPC ........... *A01D 34/008* (2013.01); *A01D 34/66* (2013.01); *A01D 34/74* (2013.01); *A01D 34/824* (2013.01); *B60W 50/082* (2013.01); *B60W 60/0053* (2020.02); *G05D 1/0061* (2013.01); *G05D 1/227* (2024.01); *A01D 2101/00* (2013.01)

(58) Field of Classification Search
CPC ................................................. B60W 60/0053
See application file for complete search history.

(56) References Cited

U.S. PATENT DOCUMENTS 5,410,923 A 5/1995 Yamashita et al.
6,591,593 B1 7/2003 Brandon et al.
(Continued)

FOREIGN PATENT DOCUMENTS

EP 3078252 A1 10/2016
JP 200855965 A 3/2008
(Continued)

*Primary Examiner* — Kevin Hurley
*Assistant Examiner* — Hosam Shabara
(74) *Attorney, Agent, or Firm* — The Webb Law Firm

(57) ABSTRACT

An object of the present invention is to provide a work vehicle that can be controlled automatically. The work vehicle includes HST's for feeding power for traveling to at least either front wheels or rear wheels mounted on a traveling vehicle body, traveling levers for operating driving of at least either the front wheels or the rear wheel, traveling links operably coupling the traveling levers with the HST's, traveling drive sections for driving either the traveling levers or the traveling links, and a traveling control section configured to activate the traveling drive sections in response to receipt of a traveling instruction for the traveling levers in the automatic control mode for automatically controlling the traveling vehicle body.

7 Claims, 10 Drawing Sheets

(51) Int. Cl.
  *A01D 34/66* (2006.01)
  *A01D 34/74* (2006.01)
  *A01D 34/82* (2006.01)
  *B60W 50/08* (2020.01)
  *G05D 1/00* (2006.01)
  *G05D 1/227* (2024.01)
  *A01D 101/00* (2006.01)

(56) References Cited

U.S. PATENT DOCUMENTS

| | | | |
|---|---|---|---|
| 8,758,195 B2 * | 6/2014 | Iwaki | B60W 30/182 |
| | | | 477/52 |
| 8,838,311 B2 * | 9/2014 | Koike | B60L 15/2036 |
| | | | 701/41 |
| 10,370,012 B2 | 8/2019 | Brooks et al. | |
| 10,517,208 B2 * | 12/2019 | Kuriyagawa | A01D 34/64 |
| 10,732,627 B1 | 8/2020 | Roberson et al. | |
| 11,303,240 B2 * | 4/2022 | Ito | B62D 11/04 |
| 2004/0129486 A1 | 7/2004 | Chernoff et al. | |
| 2012/0323420 A1 | 12/2012 | Koike et al. | |
| 2013/0030667 A1 | 1/2013 | Fujimoto et al. | |
| 2013/0320905 A1 | 12/2013 | Uryu | |
| 2014/0129110 A1 | 5/2014 | Fujimoto et al. | |
| 2015/0149014 A1 | 5/2015 | Kees et al. | |
| 2016/0041553 A1 | 2/2016 | Sato et al. | |
| 2016/0192585 A1 | 7/2016 | Takaoka et al. | |
| 2016/0295797 A1 | 10/2016 | Ito et al. | |
| 2016/0340867 A1 | 11/2016 | Matsuzaki | |
| 2017/0017233 A1 | 1/2017 | Ichikawa et al. | |
| 2018/0072326 A1 | 3/2018 | Ichikawa et al. | |
| 2018/0105184 A1 | 4/2018 | Urano et al. | |
| 2018/0113454 A1 | 4/2018 | Emura et al. | |
| 2018/0157256 A1 | 6/2018 | Oniwa et al. | |
| 2018/0173228 A1 | 6/2018 | Wada et al. | |
| 2018/0186376 A1 | 7/2018 | Lee et al. | |
| 2018/0194364 A1 | 7/2018 | Asakura et al. | |
| 2018/0210444 A1 | 7/2018 | Sakaguchi et al. | |
| 2018/0237031 A1 | 8/2018 | Imai et al. | |
| 2018/0257667 A1 | 9/2018 | Yoshii et al. | |
| 2018/0299889 A1 | 10/2018 | Yokota | |
| 2018/0299890 A1 | 10/2018 | Ewert | |
| 2018/0348758 A1 | 12/2018 | Nakamura et al. | |
| 2019/0054919 A1 | 2/2019 | Noto et al. | |
| 2019/0066402 A1 | 2/2019 | Unagami et al. | |
| 2019/0086916 A1 | 3/2019 | Choi | |
| 2019/0111789 A1 * | 4/2019 | Matsuda | B60L 1/003 |
| 2019/0155279 A1 | 5/2019 | Tayama | |
| 2019/0387670 A1 * | 12/2019 | Matsuda | B60L 50/16 |

FOREIGN PATENT DOCUMENTS

| | | |
|---|---|---|
| JP | 201350205 A | 3/2013 |
| JP | 2016123377 A | 7/2016 |

* cited by examiner

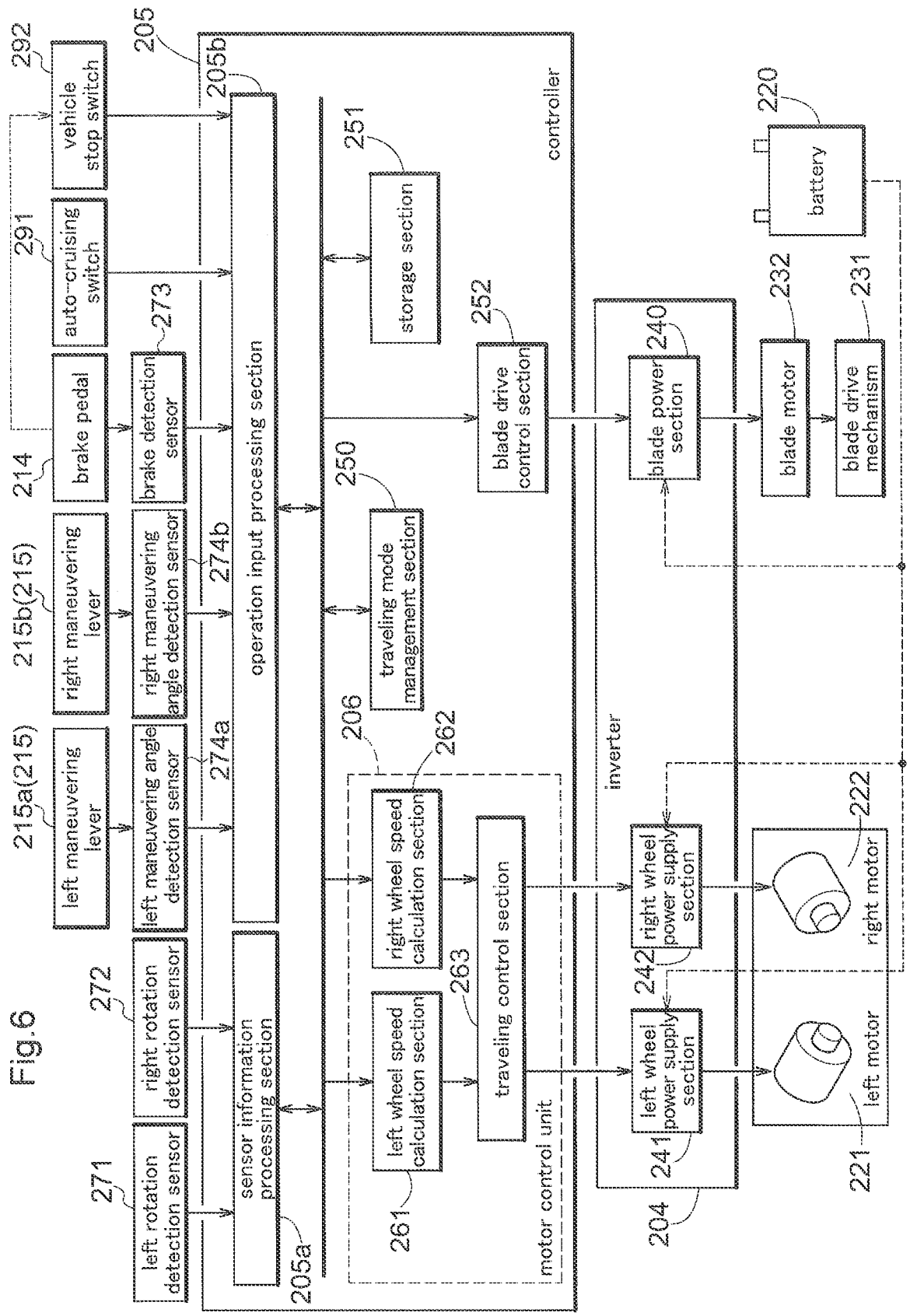

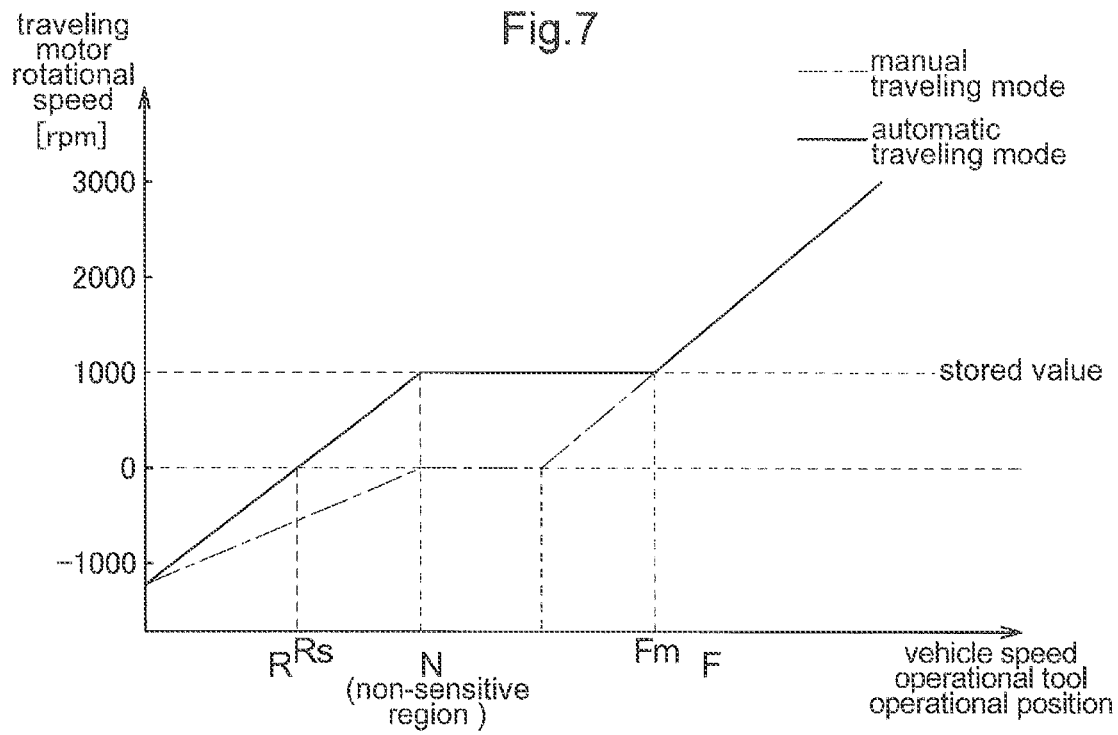
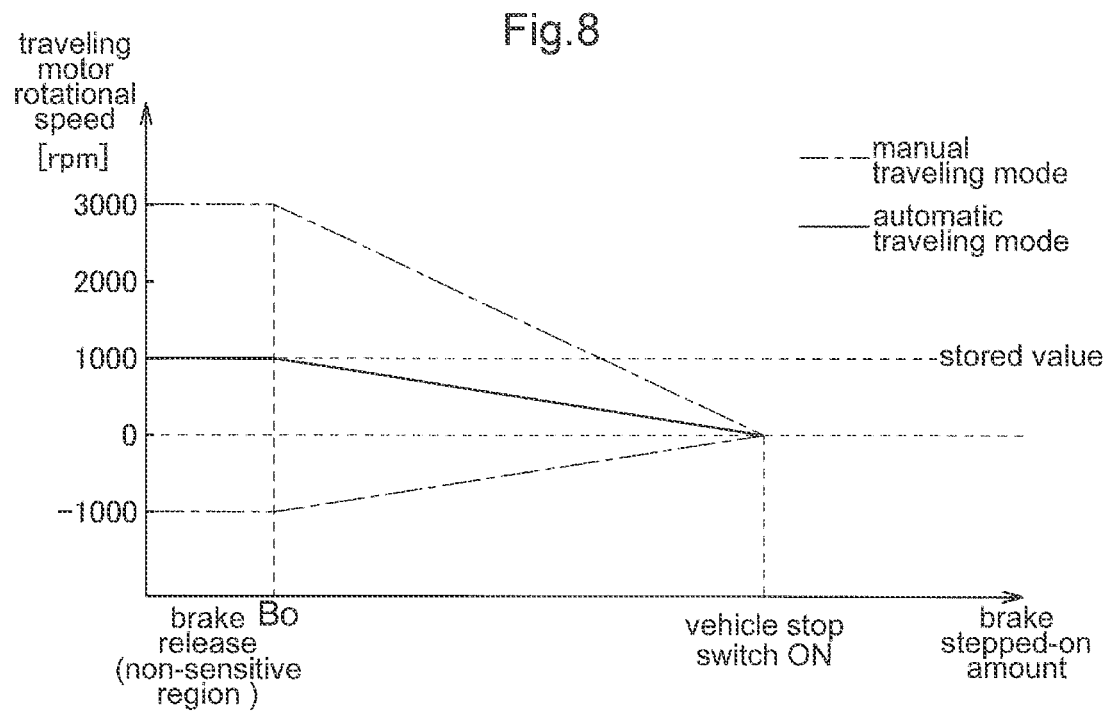

WORK VEHICLE AND GRASS MOWING MACHINE

CROSS-REFERENCE TO RELATED APPLICATIONS

This application is a divisional of U.S. patent application Ser. No. 16/378,697 filed Apr. 9, 2019 which claims priority to Japanese Patent Application Nos. 2018-118111 and 2018-199330, filed Jun. 21, 2018 and Oct. 23, 2018, respectively, the disclosures of which are hereby incorporated by reference in their entirety.

TECHNICAL FIELD

This invention relates to a work vehicle and a grass mowing machine.

BACKGROUND ART (1) Some work vehicles can be automatically controlled.

Patent Document 1 discloses a grass mowing machine for mowing grass (lawn) or the like while traveling. The grass mowing machine of Patent Document 1 includes a mower unit mounted under a traveling machine body and is configured such that a blade unit provided inside the mower unit is rotatably driven for grass cutting (mowing) in a grass land or a lawn land.

This grass mowing machine includes various kinds of operational tools including a left traveling lever and a right traveling lever for operating a left traveling wheel and a right traveling wheel respectively, an accelerator lever capable of changing a rotational speed of an engine, a PTO lever for engaging/disengaging power transmission to a PTO shaft, a brake lever for stopping the left and right traveling wheels, a raising pedal and a lowering pedal for raising and lowering the mower unit respectively. By operating these various kinds of operational tools, a driver of the grass mowing machine can control a traveling direction and a traveling speed of the grass mowing machine, raising and lowering of the mower unit, etc.

(2) Also, some grass mowing machines include a drive wheel unit driven by a traveling motor and a vehicle speed operational tool capable of adjusting a vehicle speed of the machine body.

For instance, with a riding type grass mowing machine disclosed in Patent Document 2, a vehicle speed for forward traveling in an automatic traveling mode ("automatic cruising" in the document) is stored and in the automatic traveling mode, the vehicle speed is controlled by the stored vehicle speed. Even if a vehicle speed is changed in response to an operation on a vehicle speed operational tool ("speed changing pedal", or "forward/reverse traveling switchover lever" in the document) during the automatic traveling mode, after completion of the vehicle speed operational tool operation, the control will be resumed with the stored vehicle speed. With this arrangement, even if forward and reverse traveling operations of the riding type grass mowing machine are effected frequently, there is no need to switch over between the automatic traveling mode and a manual traveling mode, thus allowing the automatic traveling mode to be continued.

Power of this riding type grass mowing machine is provided by an engine. Power of the engine is transmitted to front and rear wheels via a hydrostatic stepless speed changer device. Rotational angles of a trunnion shaft of the hydrostatic stepless speed changer device corresponding to pre-stored vehicle speeds are stored, and in the automatic traveling mode, control is effected such that the rotational angle of the trunnion shaft becomes an angle corresponding to the pre-stored vehicle speed.

BACKGROUND ART DOCUMENTS

Patent Documents

[Patent Document 1] Japanese Unexamined Patent Application Publication No. 2016-123377
[Patent Document 2] Japanese Unexamined Patent Application Publication No. 2008-55965

SUMMARY OF INVENTION

Object to be Achieved by Invention (1) An object corresponding to Background Art (1) is as follows.

As described above, with a grass mowing machine, by operating various kinds of operational tools, it is possible to control e.g. a traveling direction and a traveling speed of the grass mowing machine and raising/lowering of the mower unit, etc. However, with the grass mowing machine of the type disclosed in Patent Document 1 also, it is desired to provide an arrangement that can cause the grass mowing machine to travel automatically to effect a grass mowing operation, without need for the driver to actually operate the various kinds of operational tools.

However, with the above-described grass mowing machine, for instance, the left stepless speed changer device for providing power to the left traveling wheel for driving this left traveling wheel and a left traveling lever for operating the left traveling wheel are operatively connected to each other via a link. Namely, when the left traveling lever is operated, this operation will be transmitted to the left stepless speed changer device via the link, so that the left traveling wheel will be driven in accordance with the operation of this left traveling lever. In this way, as the left traveling lever and the left stepless speed changer lever are mechanically connected to each other via the link, it is difficult to adopt a technique of driving the left traveling wheel with automatic activation of the left stepless speed changer device with transmission of a signal for driving this left stepless speed changer device. The other operational tools too are connected to the drive mechanism via a link similarly. Thus, it is difficult to adopt the technique of controlling a drive mechanism by transmission of a signal thereto. Therefore, for the work vehicle adopting the configuration of an operational tool and a drive mechanism being mechanically connected to each other via a link, there remains a need for an arrangement that allows automatic control thereof.

Thus, the object of the present invention is to provide a work vehicle that can be controlled automatically.

(2) An object corresponding to Background Art (2) is as follows.

With the riding type grass mowing machine disclosed in Patent Document 2, for releasing the automatic traveling mode, it is necessary to operate an automatic cruising switch. Thus, there remains room for improvement for the release of the automatic traveling mode based on an instantaneous judgment. Further, for adjustment of the rotational angle of the trunnion shaft of the hydrostatic stepless speed changer device, a device such as a servo motor, a potentiometer or the like is needed. Thus, there is a risk of complicating the control system.

In view of the above-described state of the art, the object of the present invention is to provide a grass mowing machine that allows control of a vehicle speed in an automatic traveling mode with a simple arrangement and that also allows releasing of the automatic traveling mode based on an instantaneous judgment.

Solutions (1) Solution corresponding to the Object (1) is as follows.

According to a characterizing arrangement of a work vehicle relating to the present invention, the work vehicle comprises:
- a traveling vehicle body including a pair of left and right front wheels and a pair of left and right rear wheels;
- a left stepless speed changer device configured to supply power to at least either one of the front wheel and the rear wheel which are disposed on the left side of the traveling vehicle body;
- a right stepless speed changer device configured to supply power to at least either one of the front wheel and the rear wheel which are disposed on the right side of the traveling vehicle body;
- a left traveling operational tool for operating driving of at least either one of the front wheel and the rear wheel which are disposed on the left side of the traveling vehicle body;
- a right traveling operational tool for operating driving of at least either one of the front wheel and the rear wheel which are disposed on the right side of the traveling vehicle body;
- a left traveling link configured to connect the left traveling operational tool with the left stepless speed changer device in order to transmit an operation of the left traveling operational tool to the left stepless speed changer device;
- a right traveling link configured to connect the right traveling operational tool with the right stepless speed changer device in order to transmit an operation of the right traveling operational tool to the right stepless speed changer device;
- a left traveling drive section for driving at least one of the left traveling operational tool and the left traveling link;
- a right traveling drive section for driving at least one of the right traveling operational tool and the right traveling link; and
- a traveling control section configured to activate the left traveling drive section in response to receipt of a left traveling instruction for the left traveling operational tool and to activate the right traveling drive section in response to receipt of a right traveling instruction for the right traveling operational tool, in an automatic control mode for automatically controlling the traveling vehicle body.

With the above-described arrangement, in the automatic control mode, the traveling control section activates the traveling drive section according to a traveling instruction, so that the traveling operational tool and/or the traveling link will be driven. Thus, it is possible to drive the stepless speed changer device which is mechanically connected to the traveling operational tool via the traveling link. Therefore, even with the work vehicle adopting the arrangement of an operational tool such as the traveling operational tool and a drive mechanism such as the stepless speed changer device being mechanically connected to each other via a link such as the traveling link, an automatic control for e.g. automatically operating the traveling wheel for traveling is made possible.

According to a further characterizing arrangement of the present invention, in the automatic control mode, if the traveling control section receives a left neutral instruction for setting or releasing the left traveling operational tool to/from a neutral position, the traveling control section causes the left traveling operational tool to activate the left traveling drive section in response to the left neutral instruction; and if the traveling control section receives a right neutral instruction for setting or releasing the right traveling operational tool to/from a neutral position, the traveling control section causes the right traveling operational tool to activate the right traveling drive section in response to the right neutral instruction.

With the above-described arrangement, in the automatic control mode, the traveling control section activates the traveling drive section in response to a neutral instruction, whereby the traveling operational tool will be set to the neutral position or released from the neutral position. Therefore, even with the work vehicle adopting the arrangement of the traveling operational tool and the stepless speed changer device being mechanically connected to each other via the traveling link, the traveling operational tool can be set or released to/from the neutral position, thus setting/releasing the stepless speed changer device to/from a neutral state.

According to a further characterizing arrangement of the present invention, the work vehicle further comprises: an engine; an accelerator operational tool for operating a rotational speed of the engine; an accelerator link for operably connecting the accelerator operational tool to the engine in order to transmit an operation of the accelerator operational tool to the engine; and an accelerator drive section for driving at least one of the accelerator operational tool and the accelerator link; and
  wherein in the automatic control mode, if the traveling control section receives a rotational speed adjusting instruction for the accelerator operational tool, the traveling control section activates the accelerator drive section.

With the above-described arrangement, in the automatic control mode, the traveling control section activates the accelerator drive section in response to a rotational speed adjusting instruction, whereby the accelerator operational tool and/or the accelerator link will be activated. With this, even with the work vehicle adopting the arrangement of the accelerator operational tool and the engine being mechanically connected to each other via the accelerator link, the rotational speed of the engine can be controlled automatically.

According to a further characterizing arrangement of the present invention, the work vehicle further comprises: a PTO shaft for taking off power from the engine; a PTO clutch for engaging/disengaging the power transmitted from the engine to the PTO shaft; a PTO operational tool for operating the PTO clutch; a PTO link for operably connecting the PTO operational tool to the PTO clutch for transmitting an operation of the PTO operational tool to the PTO link; and a PTO drive section for driving at least one of the PTO operational tool and the PTO link;
  wherein in the automatic control mode, if the traveling control section receives an engaging/disengaging instruction for the PTO operational tool, the traveling control section activates the PTO drive section.

With the above-described arrangement, in the automatic control mode, the traveling control section activates the PTO drive section in response to an engaging/disengaging instruction, whereby the PTO operational tool and/or the PTO link will be activated. With this, even with the work vehicle adopting the arrangement of the PTO operational tool and the PTO clutch being mechanically connected to each other via the PTO link, engagement and disengagement of the PTO clutch can be controlled automatically.

According to a further characterizing arrangement of the present invention, the work vehicle further comprises: a brake for stopping driving of at least one of the front wheel and the rear wheel; a brake operational tool for operating the brake; a brake link for operably connecting the brake operational tool to the brake for transmitting an operation of the brake operational tool to the brake; and a brake drive section for driving at least one of the brake operational tool and the brake link;

wherein in the automatic control mode, if the traveling control section receives a braking instruction for the brake operational tool, the traveling control section activates the brake drive section.

With the above-described arrangement, in the automatic control mode, the traveling control section activates the brake drive section in response to a braking instruction, whereby the brake operational tool and/or the the brake link will be activated. With this, even with the work vehicle adopting the arrangement of the brake operational tool and the brake being mechanically connected to each other via the brake link, the brake can be controlled automatically.

According to a further characterizing arrangement of the present invention, the work vehicle further comprises: a brake lock section for locking the brake operational tool when the brake is operated; a brake lock operational tool for operating locking or lock-releasing of the brake operational tool by the brake lock section; and a brake lock drive section for driving the brake lock section;

wherein in the automatic control mode, if the traveling control section receives a locking instruction for locking the brake operational tool, the traveling control section activates the brake lock drive section for causing the brake lock section to lock the brake operational tool; and if the traveling control section receives a lock releasing instruction for releasing locking of the brake operational tool, the brake lock drive section activates the brake lock drive section for causing the brake lock section to release locking of the brake operational tool.

With the above-described arrangement, in the automatic control mode, the traveling control section activates the brake lock drive section in response to a locking instruction or a lock releasing instruction for the brake operational tool, the brake lock drive section drives the brake lock section according to the locking instruction or the lock releasing instruction, whereby the brake lock section can be automatically controlled for setting the brake operational tool to either a locking state or a lock releasing state.

According to a further characterizing arrangement of the present invention, the work vehicle further comprises: a mower unit for mowing grass; a mower lift operational tool for operating lifting up/down of the mower unit; a mower lift mechanism for lifting up/down the mower unit in response to an operation of the mower lift operational tool; a mower lift link for operably connecting the mower lift operational tool to the mower lift mechanism; and a mower lift drive section for driving either the mower lift operational tool or the mower lift link;

wherein in the automatic control mode, the traveling control section activates the mower lift drive section in response to a mower lifting-up instruction or a mower lifting-down instruction for the mower lift operational tool.

With the above-described arrangement, in the automatic control mode, the traveling control section activates the mower lift drive section in response to a mower lifting-up instruction or a mower lifting-down instruction, whereby the mower lift operational tool and/or the mower lift link will be driven. With this, even with the work vehicle adopting the arrangement of the mower lift operational tool and the mower lift mechanism being mechanically connected to each other via the mower lift link, the mower lift mechanism can be controlled automatically.

According to a further characterizing arrangement of the present invention, the work vehicle further comprises: a mowing height operational tool for operating adjustment of a mowing height of grass to be mowed by the mower unit; a mowing height adjustment mechanism for lifting up/down the mower unit in response to an operation of the mowing height operational tool; a mowing height adjustment link for operably connecting the mowing height operational tool to the mowing height adjustment mechanism in order to transmit the operation of the mowing height operational tool to the moving height adjustment mechanism; and a mowing height drive section for driving at least one of the mowing height operational tool and the mowing height adjustment link;

wherein in the automatic control mode, the traveling control section activates the mowing height drive section in response to a mowing height operation instruction for the mowing height operational tool.

With the above-described arrangement, in the automatic control mode, the traveling control section activates the mowing height drive section according to a mowing height operation instruction, whereby the mowing height operational tool and/or the mowing height adjustment link will be driven. With this, it is possible to drive the mowing height adjustment mechanism which is mechanically connected to the mowing height operational tool via the mowing height adjustment link. As a result, the mowing height adjustment mechanism can be automatically driven according to the mowing height operation instruction.

(2) Solution corresponding to the Object (2) is as follows.

According to a characterizing arrangement of a grass mowing machine, the grass mowing machine comprises:
 a drive wheel unit driven by a traveling motor;
 a vehicle speed operational tool capable of adjusting a vehicle speed of a machine body;
 an operation detection section capable of detecting an operational position of the vehicle speed operational tool;
 a traveling control section for controlling a rotational speed of the traveling motor based on the operational position;
 a brake device capable of braking the drive wheel unit based on an operation of a brake operational tool;
 a storage section capable of storing a drive state of the machine body; and
 a traveling mode management section capable of switching over between an automatic traveling mode in which the traveling control section controls the rotational speed of the traveling motor based on the stored drive state and a manual traveling mode in which the traveling control section controls the rotational speed of the traveling motor based on the operational position by a manual operation of the vehicle speed operational tool;

wherein in the automatic traveling mode, the traveling mode management section switches over to the manual traveling mode if the brake operational tool is operated by an amount greater than a set operational amount which is set preliminarily.

With the invention described above, the drive wheel unit is driven by a traveling motor. Thus, in comparison with an arrangement in which a vehicle speed is adjusted based on power of an engine, adjustment of the vehicle speed is easier. Further, with this invention, since the brake operational tool is used not only for operating the brake device, but also for releasing the automatic traveling mode, the automatic traveling mode can be released in the event of stop of the grass mowing machine based on an instantaneous judgment made by the driver. With this, in comparison with an arrangement in which the automatic traveling mode is released in response to an operation of an automatic cruising switch, release of the automatic traveling mode is possible based on an instantaneous judgement made by the driver. As a result, there has been realized a grass mowing machine that allows vehicle speed control in the automatic traveling mode with a simple arrangement and allows also release of the automatic traveling mode based on an instantaneous judgment made by the driver.

In the present invention, preferably, the brake operational tool comprises a brake pedal and there is provided a brake detection sensor capable of detecting an operational amount of the brake pedal, the brake detection sensor detecting an operation of the brake pedal greater in amount than the set operational amount.

With this arrangement, a brake pedal commonly employed in a grass mowing machine is used also for the operation of releasing the automatic traveling mode. And, an operation of the brake pedal greater in amount than the set operational amount is detected by the brake detection sensor. With this, the releasing operation of the automatic traveling mode is possible by the driver's stepping on the brake strongly. Thus, release of the automatic traveling mode based on an instantaneous judgment made by the driver is made easier.

In the present invention, preferably, there is provided a brake sensor capable of detecting the braking action; and in the automatic traveling mode, the traveling mode management section switches over to the manual traveling mode if the brake sensor detects the braking action.

With this arrangement, releasing of the automatic traveling mode is possible based on detection of the braking action of the brake device. Thus, the arrangement for releasing the automatic traveling mode in association with speed reduction of the machine body can be readily made.

In the present invention, preferably, there is provided a vehicle stop switch operable in association with an operation of the brake operational tool, the vehicle stop switch being operated if the brake operational tool is operated by an amount greater than the set operational amount; and
wherein in the automatic traveling mode, the traveling mode management section switches over to the manual traveling mode if the vehicle stop switch is operated.

With this arrangement, the automatic traveling mode is released by an operation of the vehicle stop switch associated with an operation of the brake operational tool. Thus, the arrangement for releasing the automatic traveling mode in association with stop of the machine body can be readily made.

In the present invention, preferably, the vehicle speed operational tool is operable among/to a forward traveling speed changing region capable of changing a forward traveling vehicle speed, a reverse traveling changing region capable of changing a reverse traveling vehicle speed and a neutral position located between the forward traveling speed changing region and the reverse traveling speed changing region and capable of stopping the machine body;
the storage section stores a desired position in the forward traveling speed changing region as a stored position; and
wherein in the automatic traveling mode, the traveling control section controls a rotational speed of the traveling motor based on the stored position if the vehicle speed operational tool is operated between the neutral position and the stored position; and the traveling control section controls the rotational speed of the traveling motor based on the operational position by the manual operation of the vehicle speed operational tool if the vehicle speed operational tool is operated to more acceleration side than the stored position.

With this arrangement, if the operational position of the vehicle speed operational tool is located between the neutral position and the stored position, this situation alone causes controlling the rotational speed of the traveling motor be constant, without needing driver's operating the vehicle speed operational tool. Also, if the driver operates the vehicle speed operational tool to more acceleration side than the stored position, the rotational speed of the traveling motor will be increased. Thus, even during the automatic traveling mode, the driver can increase the vehicle speed of the machine body if necessary.

In the present invention, preferably, there is set a stop position for stopping the machine body at a desired position in the reverse traveling speed changing region in the automatic traveling mode; and wherein the traveling control section controls the rotational speed of the traveling motor such that the closer the vehicle speed operational tool to the stop position in response to an operation of the vehicle speed operational tool between the neutral position and the stop position, the lower the rotational speed of the traveling motor.

With the above arrangement, if the driver operates the vehicle speed operational tool between the neutral position and the stop position, the rotational speed of the traveling motor is reduced. Thus, even in the automatic traveling mode, the driver can reduce the vehicle speed of the machine body if necessary.

In the present invention, preferably, the traveling control section reverses the rotational direction of the traveling motor to the opposite direction to the rotational direction based on the forward traveling speed changing region if the vehicle speed operational tool is operated to the side opposite to the neutral position across the stop position.

With the above arrangement, the vehicle speed operational tool is configured to be operable in the forward direction and the reverse direction across the stop position in the reverse traveling speed changing region. Thus, even in the automatic traveling mode, with only the driver's operating the vehicle speed operational tool to more reverse side than the stop position in the reverse traveling speed changing region, the machine body can be caused to travel in reverse. With this, even in a situation where forward traveling and reverse traveling of the machine body are repeated frequently, a reverse traveling by a manual operation is possible with keeping the automatic traveling mode.

BRIEF DESCRIPTION OF THE DRAWINGS

FIG. 6 is a functional block diagram of a control system of the grass mowing machine, FIG. 7 is a graph showing relation between an operational position of a vehicle speed operational tool and a rotational speed of a traveling motor, FIG. 8 is a graph showing relation between a stepped-on amount of a brake pedal and a rotational speed of a traveling motor.

EMBODIMENTS

First Embodiment

Next, an explanation will be made with using a grass mowing machine referred to as a "mid-mount type zero-turn mower" as one example of a work vehicle according to the present invention.

Incidentally, unless indicated otherwise, a front/rear direction refers to a longitudinal direction of a machine body which is also the traveling direction of the grass mowing machine. And, a lateral (transverse) direction or left/right direction refers to the direction traversing the machine body longitudinal direction horizontally. Also, a vertical direction or a height direction refers to the normal direction which means the direction normal to ground surface or the machine body horizontal plane.

General Arrangement

Figure 1:
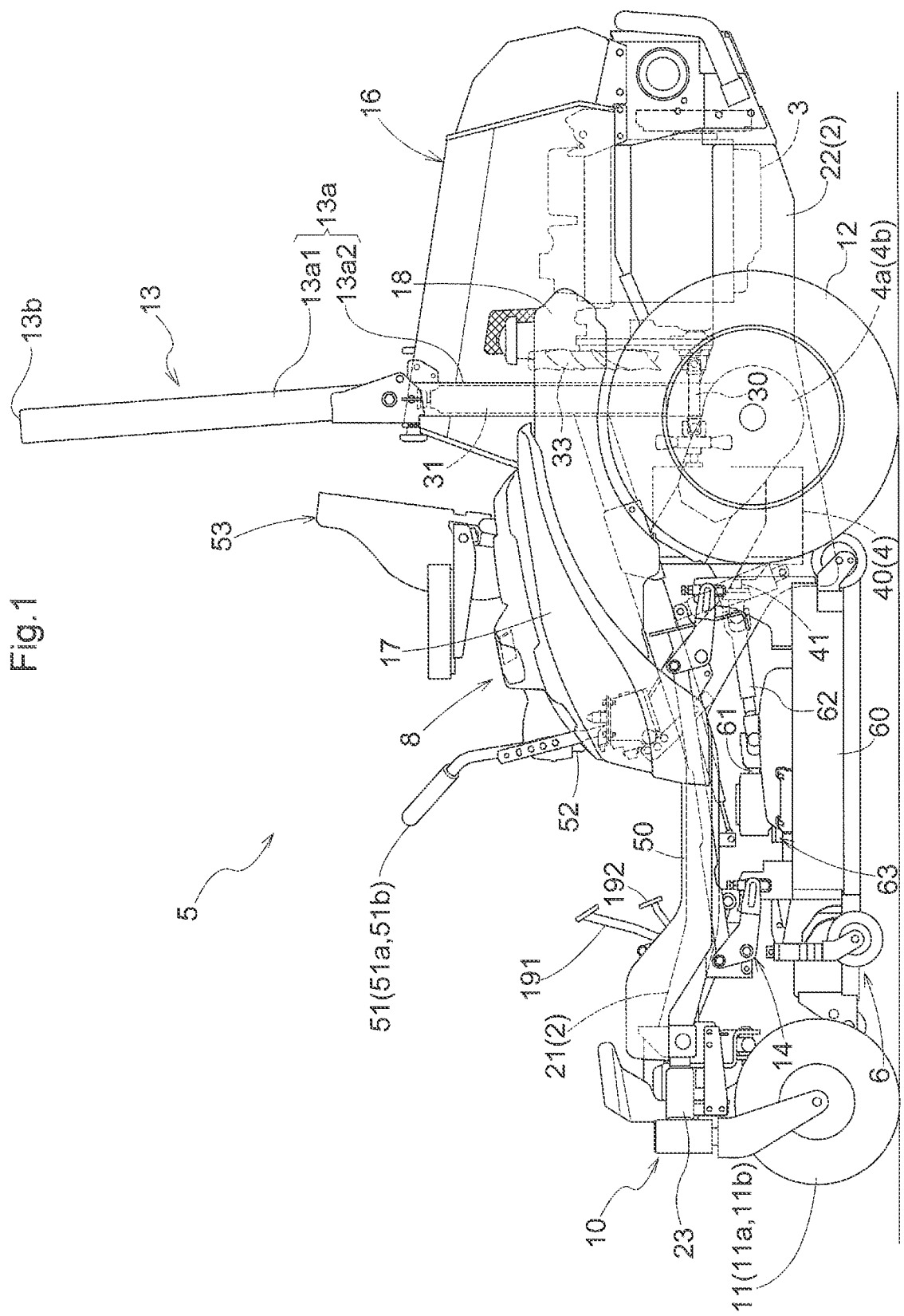
FIG. 1 is a view showing a first embodiment (applied also up to FIG. 3), which a side view showing a grass mowing machine in its entirety.
Figure 2:
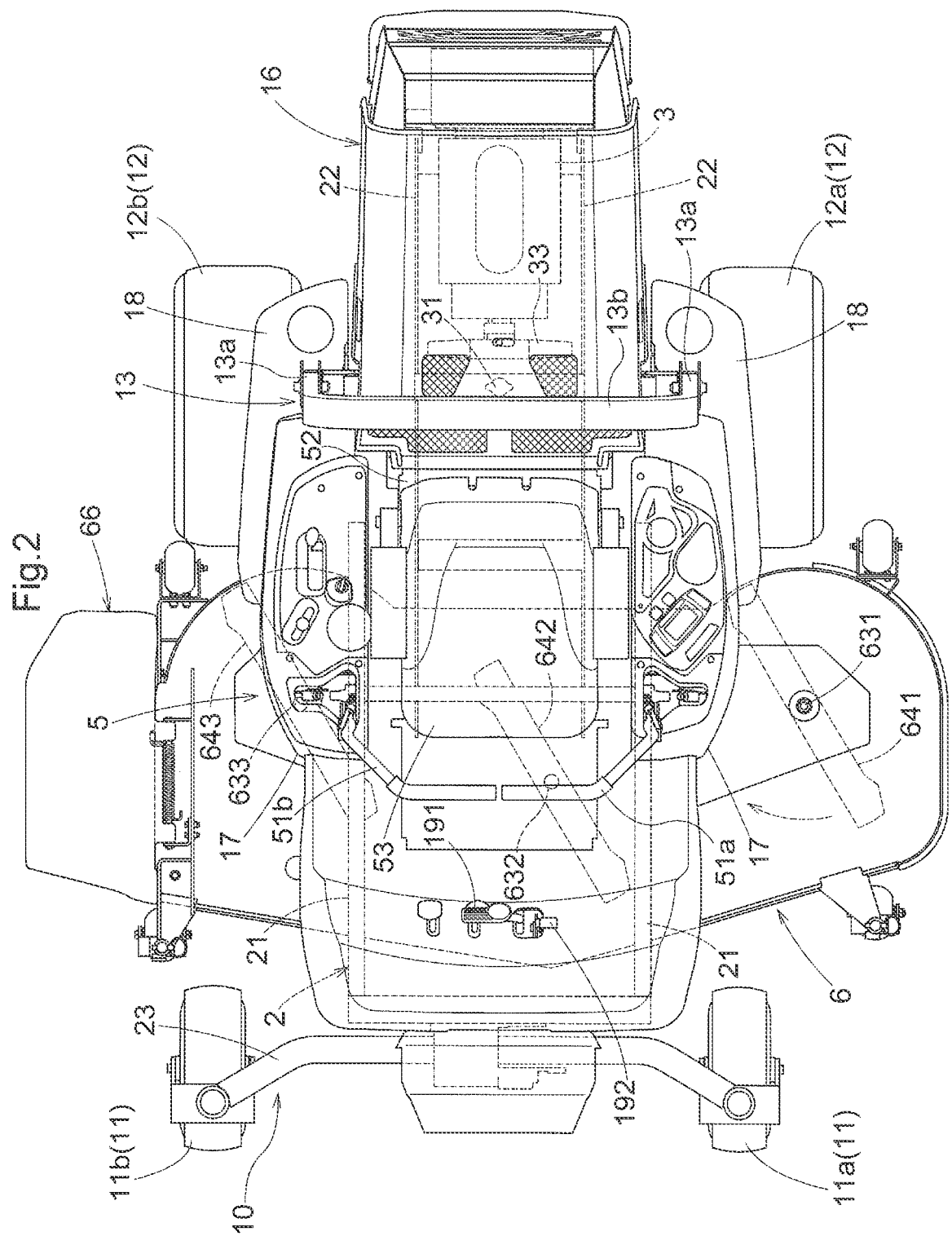
FIG. 2 is a top view showing the grass mowing machine in its entirety.

In a grass mowing machine shown in FIG. 1 and FIG. 2, there is provided a machine body frame 2 which extends in the front/rear direction of a traveling machine body 10. This machine body frame 2 of the traveling machine body 10 is comprised of a wide front frame 21 and a narrow rear frame 22. The front frame 21 and the rear frame 22 comprise a pair of left and right longitudinal beams extending along the machine body front/rear direction and cross beams interconnecting the longitudinal beams. The lateral width of the front frame 21 (the spacing between the left and right longitudinal beams) is greater than the lateral width of the rear frame 22. As seen in a plan view, the front portion of the rear frame 22 enters the rear portion of the front frame 21, thus being connected to each other via an unillustrated connection member.

On the front side and the rear side of the machine body frame 2, there are provided a pair of left and right front wheels 11 (a left front wheel (a front wheel disposed on the left side)) 11a and a right front wheel (a front wheel disposed on the right side) 11b) and a pair of left and right rear wheels 12 (a left rear wheel (a rear wheel disposed on the left side) 12a and a right rear wheel (a rear wheel disposed on the right side) 12b). The machine body frame 2 is supported on the ground surface by these front wheels 11 and rear wheels 12. The pair of front wheels 11 are connected via a front wheel connecting arm 23. The pair of rear wheels 12 are connected via a rear wheel connecting arm (not shown). The grass mowing machine schematically shown in FIG. 1 is a grass mowing machine called a "mid-mount zero-turn mower", with the rear wheels 12 being rotatably driven and the front wheels 11 being rotatable according to rotational drive of the rear wheels 12.

For the rear wheels 12, a rear wheel brake 96 (FIG. 3) is provided for stopping rotation of the rear wheels 12.

At a front portion of the machine body frame 2, a driving section 5 is disposed. At a rear portion of the driving section 5, there is provided a hood 16 which forms an engine room. Inside the hood 16, an engine 3 is disposed. And, forwardly of and slightly downwardly of the engine 3, a transmission 4 is disposed. From the engine 3, an input shaft 30 extends substantially horizontally for transmitting engine power to the transmission 4. Inside the hood 16, there are also provided a cooling fan 33 and a radiator 31 disposed in this order to the front side of the engine 3.

Further, from between the front wheels 11 and the rear wheels 12 of the machine body frame 2, a mower unit 6 for mowing grass (lawn) or the like is suspended from the machine body frame 2 via a mower lift mechanism 14. Also, at a rear portion of the driving section 5, a ROPS device 13 is provided.

At the driving section 5, a driver's seat 53 is fixed to a seat support 52 disposed on the machine body frame 2. Fenders 17 are formed on the left and right side faces of the seat support 52. On upper faces of the fenders 17, operational panels 8 are provided. Under the fenders 17, fuel tanks 18 are disposed respectively. At the foot area of the driver's seat 53, a step 50 is installed on the front frame 21.

Further, at the driving section 5, as shown in FIG. 1 and FIG. 2, there are provided a pair of left traveling lever (a left traveling operational tool) 51a and a right traveling lever (a right traveling operational tool) 51b and the driver's seat 53. In the following discussion, the pair of the left traveling lever 51a and right traveling lever 51b will be collectively referred to as "traveling lever 51".

Figure 3:
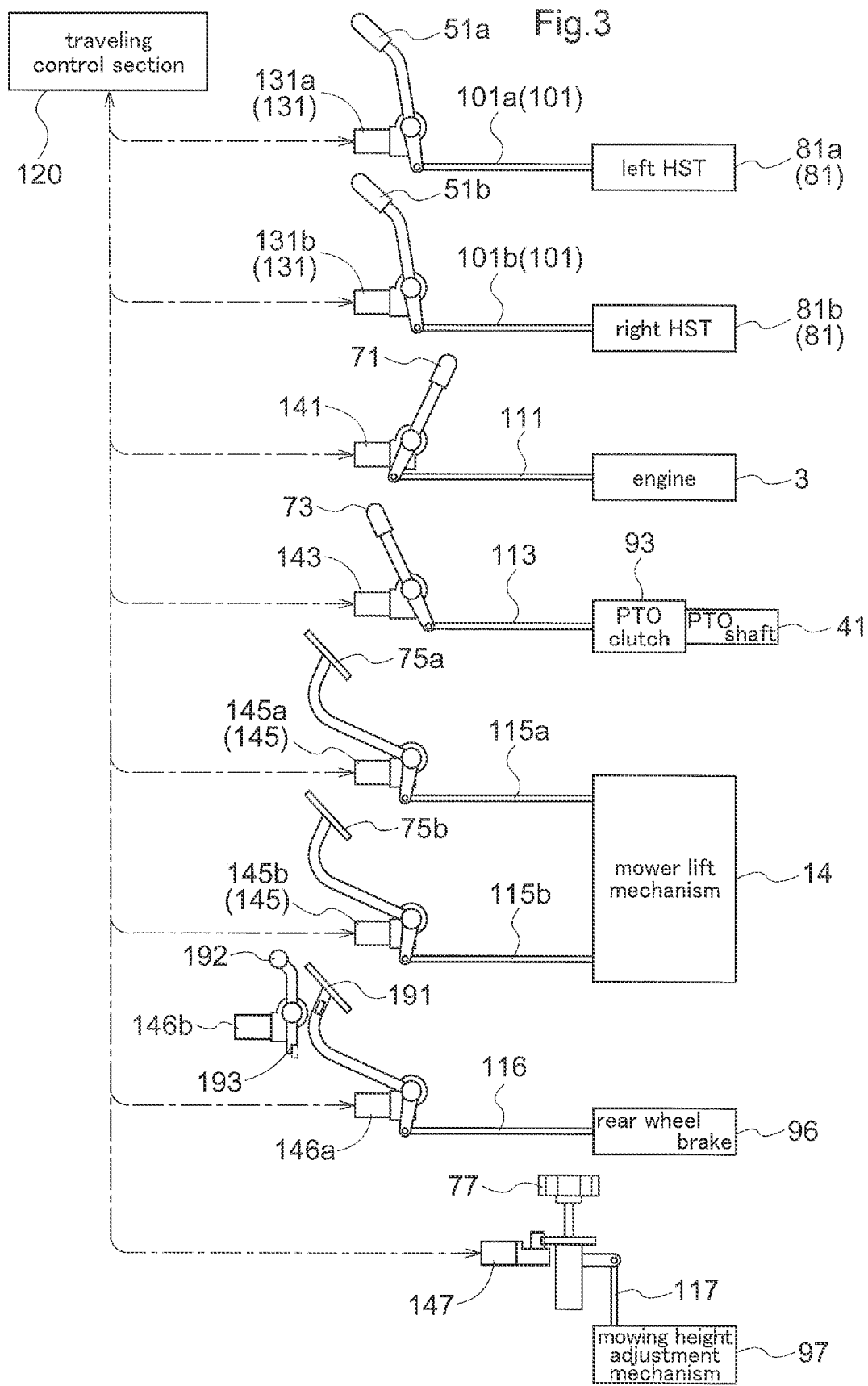
FIG. 3 is a schematic view for illustrating an automatic control mode of the grass mowing machine.

Further, at the driving section 5, as shown in FIG. 3, there are further provided various operational tools such as an accelerator lever (an accelerator operational tool) 71, a PTO (Power Take-Off) lever 73 (a PTO operational tool), a lift-up pedal (a mower lift operational tool) 75a, a lift-down pedal (a mower lift operational tool) 75b, a mowing height operational tool 77, and so on.

Also, as further operational tools, there are provided a brake pedal (a brake operational tool) 191, a brake lock pedal (a brake lock operational tool) 192, etc. The brake pedal 191 is disposed adjacent the center of the front region of the step 50. The brake lock pedal 192 is disposed on the lateral side of the brake pedal 191 as a parking pedal for maintaining the brake pedal 131 at its stepped-on position. When the brake lock pedal 192 is operated, a brake lock portion (FIG. 3) 193 is retained to the brake pedal 191, thus rendering the brake pedal 191 to a locked state. When detached, the brake lock pedal 192 will be rendered into a lock releasing state.

The transmission 4 transmits power of the engine 3 to the front wheels 11 and the rear wheels 12 constituting a traveling system. The transmission 4 includes a left rear axle transmission section 4a on the left side of the traveling machine body 10 and a right rear axle transmission section 4b on the right side of the traveling machine body 10. The left rear axle transmission section 4a and the right rear axle transmission section 4b respectively incorporate independently operable hydrostatic speed changer mechanisms (HST: Hydro-Static Transmission) as an example of stepless speed changer mechanism. Namely, the left rear axle transmission section 4a includes a left HST (left stepless speed changer device) 81a (FIG. 3) and the right rear axle transmission section 4b includes a right HST (right stepless speed changer device) 81b (FIG. 3). In the following discussion, the left HST 81a and the right HST 81b will be collectively referred to as HST 81.

Such hydrostatic speed changer mechanism is capable of changing the engine power in a stepless manner from low to high speeds under a forward rotation (forward traveling) state and a reverse rotation (reverse traveling) state and then transmitting the resultant speed-changed power to the left and right respective rear wheels 12 of the rear wheel unit. More particularly, when the left and right rear wheels 12 are driven at an equal or substantially equal speed in the forward direction, a straight forward traveling is provided. When the left and right rear wheels 12 are driven at an equal or substantially equal speed in the reverse direction, a straight reverse traveling is provided. When the speeds of the left and right rear wheels 12 are made different from each other, the traveling machine body 10 can be turned in a desired direction. For instance, when either one of the left and right rear wheels 12 is set to a low speed near the zero speed and the other rear wheel 12 is operated in the forward side or reverse side at a high speed, a small turn is made possible. Further, when the left and right rear wheels 12 are driven in directions opposite to each other, it is possible to cause the traveling machine body 10 make a spin turn, with the substantial center of the left and right rear wheels 12 being the center of the turn. The front wheels 11 are configured as a pair of left and right caster wheels, so that orientation thereof about a vertical axis can be freely changed. As a result, a direction will be corrected according to the traveling direction provided by driving of the left and right rear wheels 12.

Further, the transmission 4 transmits the power of the engine 3 to a PTO shaft 41 which constitutes a utility implement system. The PTO shaft 41 protrudes forwardly from the front wall of a transmission case 40 of the transmission 4 and takes off the power from the engine 3 to transmit this power to the mower unit 6. This PTO shaft 41 and a PTO input shaft 61 of the mower unit 6 are connected to each other via a PTO relay shaft 62. Incidentally, between the PTO shaft 41 and the transmission 4, a PTO clutch 93 is provided (FIG. 3), and this PTO clutch 93 engages/disengages power transmission from the transmission 4 to the PTO shaft 41 in accordance with an operation of a PTO lever 73.

By operating the pair of left and right traveling levers 51 disposed on the opposed sides of the driver's seat 53, speed changing operations of the transmission 4, in particular, speed changing operations on the left rear axle transmission section 4a and the right rear axle transmission section 4b are effected. When the traveling lever 51 is maintained at a front/rear neutral position, the stepless speed changer device is set to its neutral stopped state. When the traveling lever 51 is operated forwardly from the neutral position, a forward traveling speed change is realized. When it is operated reversely, a reverse traveling speed change is realized.

The ROPS device 13, which is provided rearwardly of the driver's seat 53, incudes a pair of left and right struts 13a and a transverse member 13b connecting upper ends of the struts 13a to each other. Each strut 13a is pivotally foldable at its intermediate portion. A leg portion 13a2 which is the lower half of the strut 13a is bent to the inner side at a position of substantially same height as the upper end of the rear frame 22 and extends to reach the rear end of the front frame 21. The rear end of the front frame 21 and the leg portion 13a2 of the ROPS device 13 are connected to each other via a connection bracket. A straight strut portion 13a1 which is the upper half of the strut 13a is connected via a pivotal connection portion to the leg portion 13a2 to be pivotable between a vertical posture and a horizontal (or downward) posture.

The mower unit 6 for mowing grass (lawn) includes a mower deck 60 consisting of a ceiling wall and a circumferential wall extending downwards from the outer circumference of the ceiling wall. This mower deck 60 includes a blade unit consisting of a left blade 641, a center blade 642 and a right blade 643. Thus, in the mower deck 60, there is provided a belt transmission unit 63 for distributing the power received by the PTO input shaft 61 to a first rotational shaft 631, a second rotational shaft 632 and a third rotational shaft 633 disposed side by side in the transverse direction and each having a vertical axis. The transmission unit 63 receives power from the transmission 4 via the PTO shaft 41, the PTO relay shaft 62 and the PTO input shaft 61. The first rotational shaft 631 is attached with the left blade 641. The second rotational shaft 632 is attached with the center blade 642. The third rotational shaft 633 is attached with the right blade 643. The left blade 641, the center blade 642 and the right blade 643 are respectively rotatable clockwise as seen in the plan view.

The mower unit 6 is vertically pivotable in response to operations of the lift-up pedal 75a and the lift-down pedal 75b by the mower lift mechanism 14 between a lowered work state in which the mower deck 60 is positioned near the ground surface and an elevated non-work state in which the mower deck 60 is lifted up off the ground surface. When the grass mowing machine travels with setting the mower unit 6 under the lowered work state and the blade unit of the mower unit 6 is rotatably driven, a mowing operation in a grass land or lawn land is carried out. In this, cut grass clippings will be discharged as being guided by an air current generated in association with driving of the blade unit or by an air current generated by a separately provided blower from a cut grass discharging section 66 formed at the right end portion of the mower deck 60.

Further, the mower unit 6 is provided with a mowing height adjustment mechanism 97 (FIG. 3) for lifting up/down the mower unit 6 in order to adjust a mowing height of the grass to be mowed. This mowing height adjustment mechanism 97 lifts up/down the mower unit 6 to a desired mowing height according to an operation of a mowing height operational tool 77.

The various operational tools such as the traveling levers 51, the accelerator lever 71, the PTO lever 73, the lift-up pedal 75a, the lift-down pedal 75b, the mowing height operational tool 77, the brake pedal 191, the brake lock pedal 192, etc. can be operated manually by a hand, a foot, etc. of the driver. And, by the driver's operation of these various operational tools, various devices and various mechanisms, etc. corresponding to the various operational tools will be driven. In this way, the grass mowing machine relating to this embodiment includes a manual operation mode in which the various operational tools are operated manually to drive the various devices and mechanisms. Further, the grass mowing machine relating to this embodiment is provided, in addition to the manual operation mode, with an automatic control mode in which various devices and mechanisms are driven automatically. And, the machine is provided with a traveling control section 120 (FIG. 3) for controlling driving of the various operational tools in this automatic control mode and various drive sections (FIG. 3) to be controlled by the traveling control section 120.

The grass mowing machine relating to the instant embodiment, includes, as such various drive sections for driving the various operational tools and as shown in FIG. 3, a left traveling drive section 131*a*, a right traveling drive section 131*b*, an accelerator drive section 141, a PTO drive section 143, a mower lift-up drive section (mower lift drive section) 145*a*, a mower lift-down drive section (mower lift drive section) 145*b*, a brake drive section 146*a*, a brake lock drive section 146*b*, and a mowing height drive section 147.

These various drive sections can employ a stepping motor which allows fine adjustment of a rotational angle. Further, if a gear ratio used in the stepping motor is set to a large value such as a value greater than or equal to 1:10, a sufficient torque can be secured even with a compact motor.

Further, if the various drive sections are caused to incorporate the traveling control section 120 which will be described later, cost reduction is made possible. Incidentally, if stepping-out phenomenon occurs in the motor constituting the various drive sections, the control by the traveling control section 120 may be stopped for ending the automatic control mode. Also, the origin of starting the drive of the motor can be obtained by a limit switch. Incidentally, when the various drive sections operate the various operational tools, an absolute position may be determined by a potentiometer.

[Driving of Various Devices, Various Mechanisms, Etc. By Various Operational Tools]

Next, arrangements of driving of the various devices, the various mechanisms, etc. by the various operational tools will be explained.

The left and right traveling levers 51 are arranged to be operably coupled with the left HST 81*a* and the right HST 81*b* for transmitting the driving power from the engine 3 to the left and right rear wheels independently.

As shown in FIG. 3, between the left traveling lever 51*a* and the left HST 81*a*, there is provided a left traveling link 101*a* configured to connect the left traveling lever 51*a* with the left HST 81*a* in order to transmit an operation of the left traveling lever 51*a* to the left HST 81*a*. Similarly, between the right traveling lever 51*b* and the right HST 81*b*, there is provided a right traveling link 101*b* configured to connect the right traveling lever 51*b* with the right HST 81*b* in order to transmit an operation of the right traveling lever 51*b* to the right HST 81*b*.

With the above-described arrangement in operation, when the left traveling lever 51*a* is pivotally operated in the vehicle front/rear direction, this operation is transmitted via the left traveling link 101*a* to the left HST 81*a* of the left rear wheel 12*a*, whereby the left HST 81*a* is operated for a speed change. On the other hand, when the right traveling lever 51*b* is pivotally operated in the vehicle front/rear direction, this operation is transmitted via the right traveling link 101*b* to the right HST 81*b* of the right rear wheel 12*b*, whereby the right HST 81*b* is operated for a speed change. With this, if the left and right traveling levers 51 are pivotally operated in the same way either forwardly or reversely, the self-propelled vehicle will travel forwardly or reversely. If the left and right traveling levers 51 are pivotally operated in different manners, the self-propelled vehicle will make a right or left turn. In the following discussion, the left traveling link 101*a* and the right traveling link 101*b* will be collectively referred to as the traveling link 101.

In the manual operation mode, the driver will operate the traveling levers 51 for driving the rear wheels 12, thus causing the grass mowing machine to travel. On the other hand, in the automatic control mode, a user of the grass mowing machine will transmit, via e.g. a remote controller or the like, a traveling instruction for operating the traveling levers 51, etc., whereby the traveling control section 120 will control the traveling drive section 131 (the left traveling drive section 131*a*, the right traveling drive section 131*b*) in accordance with the traveling instruction.

For instance, in the automatic control mode, if the traveling control section 120 receives a traveling instruction for the left traveling lever 51*a*, the left traveling drive section 131*a* will be activated to drive the left traveling lever 51*a*. In correspondence with this driving of the left traveling lever 51*a*, the left traveling link 101*a* operably coupled with this left traveling lever 51*a* will also be driven. With this, it is possible to drive the left HST 81*a* which is mechanically coupled to the left traveling lever 51*a* via the left traveling link 101*a*. As a result, the left rear wheel 12*a* can be automatically driven according to the traveling instruction.

Similarly, respecting the right rear wheel 12*b* too, in the automatic control mode, the traveling control section 120 can activate the right traveling drive section 131*b* according to a right traveling instruction, thus realizing automatic driving.

Incidentally, the traveling drive section 131 can drive the traveling link 101 for driving the HST 81, instead of driving the traveling lever 51 according to a traveling instruction.

Further, in the automatic control mode, if the traveling control section 120 receives a left neutral instruction for setting/releasing of the left traveling lever 51*a* to/from the neutral position, the traveling control section 120 activates the left traveling drive section 131*a* according to this left neutral instruction. With this, the left traveling lever 51*a* will be set to the neutral position or released from the neutral position and the left traveling link 101*a* operably coupled with this left traveling lever 51*a* too will be set/released to/from the neutral position. With this, the left HST 81*a* can be set to the neutral state or released from the neutral state.

Similarly, in the automatic control mode, according to a right neutral instruction, the traveling control section 120 sets/releases the right traveling lever 51*b* to/from the neutral position and the right traveling link 101*b* too will be set/released to/from the neutral position. With this, the right HST 81*b* can be set to the neutral state or released from the neutral state.

With the above-described arrangement, even for a work vehicle such as a grass mowing machine, adopting the arrangement of the traveling lever 51 and the HST 81 being mechanically connected to each other via the traveling link 101, automatic control operations to allow e.g. automatic operation of the traveling wheel, automatic setting of the HST 81 to the neutral state or releasing it therefrom, are made possible.

The accelerator lever 71 is an operational tool for operating a rotational speed of the engine 3. As shown in FIG. 3, between the accelerator lever 71 and the engine 3, there is provided an accelerator link 111 for operably coupling the accelerator lever 71 with the engine 3 in order to transmit an operation of the accelerator lever 71 to the engine 3. In operation, when the accelerator lever 71 is operated to a desired position, this operation will be transmitted to the engine 3 via the accelerator link 111, thus adjusting the rotational speed of the engine 3.

In the manual mode, the driver will operate the accelerator lever 71, whereby the rotational speed of the engine 3 is adjusted. On the other hand, in the automatic control mode, a user of the grass mowing machine will transmit a rotational speed adjusting instruction for operating the accelerator lever 71, whereby the traveling control section 120 will control the accelerator drive section 141 according to this rotational speed adjusting instruction.

For instance, in the automatic control mode, the traveling control section 120 drives the accelerator lever 71 by the accelerator drive section 141 in response to a rotational speed adjusting instruction for the accelerator lever 71. Such rotational speed adjusting instruction includes instructions e.g. for setting a rotational speed of the engine 3, as well as for increasing/decreasing the rotational speed of the engine 3. In correspondence with driving of the accelerator lever 71, the accelerator link 111 operably coupled with the accelerator lever 71 too will be driven, thus controlling the rotational speed of the engine 3.

With the above, even with a work vehicle adopting the arrangement of the accelerator lever 71 and the engine 3 being mechanically coupled with each other via the accelerator link 111, automatic control of the rotational speed of the engine 3 is made possible.

Incidentally and alternatively, the accelerator drive section 141 can drive the accelerator link 111 to drive the engine 3, instead of driving the accelerator lever 71 according to a rotational speed adjusting instruction.

The PTO lever 73 is used for driving or stopping the mower unit 6 by engaging/disengaging power transmission from the engine 3 to the PTO shaft 41 by engaging/disengaging the PTO clutch 93. As shown in FIG. 3, between the PTO lever 73 and the PTO clutch 93, there is provided a PTO link 113 for operably coupling the PTO lever 73 with the PTO clutch 93 in order to transmit an operation of the PTO lever 73 to the PTO clutch 93.

With the above-described arrangement, when the PTO lever 73 is operated, this operation is transmitted via the PTO link 113 to the PTO clutch 93, thus engaging/disengaging this PTO clutch 93.

In the manual operation mode, the driver will operate the PTO lever 73, thus engaging/disengaging the PTO clutch 93. On the other hand, in the automatic control mode, a user of the grass mowing machine will transmit e.g. an engaging/disengaging instruction to the PTO lever 73, whereby the traveling control section 120 will control the PTO drive section 143 according to this engaging/disengaging instruction.

For instance, in the automatic control mode, the traveling control section 120 activates the PTO lever 73 by the PTO drive section 143 according to an engaging/disengaging instruction to the PTO lever 73. In correspondence with driving of the PTO lever 73, the PTO link 113 operably coupled with the PTO lever 73 will also be driven, and the PTO clutch 93 will be driven. With this, even with a work vehicle such as a grass mowing machine adopting the arrangement of the PTO lever 73 and the PTO clutch 93 being mechanically coupled with each other via the PTO link 113, engagement and disengagement of the PTO clutch 93 can be automatically controlled.

Incidentally and alternatively, the PTO drive section 143 can drive the PTO link 113 to drive the PTO clutch 93, instead of driving the PTO lever 73 according to an engaging/disengaging instruction.

The brake pedal 191 is an operational tool, which, in response to its operation, operates the rear brakes 96 (FIG. 3) provided in the pair of left and right rear wheels 12 and applying the rear wheel brakes 96 to the rotation of the rear wheels 12 or releasing the rear wheel brakes 96. As shown in FIG. 3, between the brake pedal 191 and the rear wheel brake 96, there is provided a brake link 116 for operably coupling the brake pedal 191 with the rear wheel brake 96 in order to transmit an operation of the brake pedal 191 to the rear wheel brake 96. When the brake pedal 191 is operated to a desired position, this operation will be transmitted to the rear wheel brake 96 via the brake link 116.

In the manual operation mode, the driver will operate the brake pedal 191 for adjusting the rear wheel brake 96. On the other hand, in the automatic control mode, a user of the grass mowing machine will transmit a brake instruction for the brake pedal 191 and the traveling control section 120 will control the brake drive section 146a according to such brake instruction.

For instance, in the automatic control mode, the traveling control section 120 will drive the brake pedal 191 by the brake drive section 146a according to a brake instruction for the brake pedal 191. Such brake instruction includes e.g. a stopping instruction for stopping driving of the pair of rear wheels 12, and an instruction for releasing driving stop of the pair of rear wheels 12. In correspondence with driving of the brake pedal 191, the brake link 116 operably coupled with the brake pedal 191 will also be driven, so that the rear wheel brake 96 can be driven. With this, even with a work vehicle such as a grass mowing machine adopting the arrangement of the brake pedal 191 and the rear wheel brake 96 being mechanically coupled with each other via the brake link 116, automatic control of the rear wheel brake 96 is made possible.

Incidentally and alternatively, the brake drive section 146a can drive the brake link 116 for driving the rear wheel brake 96, instead of driving the brake pedal 191 according to a braking instruction.

The brake lock pedal 192 is used for maintaining a stepped-on state of the brake pedal 191 by the brake lock section 193. More particularly, the brake lock pedal 192 is an operational tool for locking or releasing locking of the brake pedal 191 by the brake lock section 193.

In the automatic control mode, the traveling control section 120, in receipt of a locking instruction for locking the brake lock pedal 192 or a lock releasing instruction for releasing locking of the brake lock pedal 192, will activate the brake lock drive section 146b to cause the brake lock section 193 to lock or release lock of the brake pedal 191. With this, automatic control of the brake lock section 193 is made possible.

The lift-up pedal 75a and the lift-down pedal 75b are operational tools for lifting up or down the mower deck 60 via the mower lift mechanism 14. As shown in FIG. 3, between the lift-up pedal 75a and the mower lift mechanism 14, there is provided a lift-up mower link 115a (mower lift link) operably coupling the lift-up pedal 75a with the mower lift mechanism 14 for transmitting an operation of the lift-up pedal 75a to the mower lift mechanism 14. When the lift-up pedal 75a is operated to a desired position, this operation will be transmitted via the lift-up mower link 115a to the mower lift mechanism 14, whereby the mower deck 60 will be lifted up (elevated). Similarly, as shown in FIG. 3, between the lift-down pedal 75b and the mower lift mechanism 14, there is provided a lift-down link (mower lift link) 115b for operably coupling the lift-down pedal 75b with the mower lift mechanism 14 in order to transmit an operation of the lift-down pedal 75b to the mower lift mechanism 14. When the lift-down pedal 75b is operated to a desired position, this operation will be transmitted via the lift-down mower link 115*b* to the mower lift mechanism 14, whereby the mower deck 60 will be lifted down (lowered).

In the manual control mode, the driver will operate the lift-up pedal 75*a* and the lift-down pedal 75*b*, thus adjusting the mower lift mechanism 14. On the other hand, in the automatic control mode, a user of the grass mowing machine will transmit a mower lift-up instruction and a mower lift-down instruction for operating the lift-up pedal 75*a* and the lift-down pedal 75*b* respectively, whereby the traveling control section 120 will control the mower lift drive section 145 (the mower lift-up drive section 145*a*, the mower lift-down drive section 145*b*) according to such mower lift-up instruction or the mower lift-down instruction.

For instance, in the automatic control mode, the traveling control section 120 drives the lift-up pedal 75*a* and the lift-down pedal 75*b* by the mower lift drive section 145 according to the mower lift-up instruction and the mower lift-down instruction for the lift-up pedal 75*a* and the lift-down pedal 75*b*. In correspondence with driving of the lift-up pedal 75*a* and the lift-down pedal 75*b* by the mower lift drive mechanism 145, the mower lift link 115 (the lift-up mower link 115*a* and the lift-down mower link 115*b*) operably coupled with the lift-up pedal 75*a* and the lift-down pedal 75*b* will also be driven, thus driving the mower lift mechanism 14. With this, even with a work vehicle such as a grass mowing machine, adopting the arrangement of the lift-up pedal 75*a* and the lift-down pedal 75*b* being mechanically coupled with the mower lift mechanism 14 via the mower lift link 115, automatic control of the mower lift mechanism 14 is made possible.

Incidentally and alternatively, the mower lift drive section 145 may drive the mower lift link 115, thus driving the mower link mechanism 14, instead of driving the lift-up pedal 75*a* and the lift-down pedal 75*b* according to the mower lift-up instruction and the mower lift-down instruction.

The mowing height operational tool 77 is an operational tool for adjusting the height of the mower deck 60 via e.g. a dial operation, thereby to adjust the mowing height. As shown in FIG. 3, between the mowing height operational tool 77 and the mowing height adjusting mechanism 97, there is provided a mower height adjustment link 117 for operably coupling the mowing height operational tool 77 with the mowing height adjustment mechanism 97 in order to transmit an operation of the mowing height operational tool 77 to the mowing height adjustment mechanism 97. When the mowing height operational tool 77 is operated to a desired position, this operation will be transmitted via the mowing height adjustment link 117 to the mowing height adjustment mechanism 97, thus adjusting the height of the mower deck 60.

In the manual control mode, the driver will operate the mowing height operational tool 77, thus adjusting the mowing height adjustment mechanism 97. On the other hand, in the automatic control mode, a user of the grass mowing machine will transmit e.g. a mowing height operation instruction for operating activating the mowing height operational tool 77, whereby the traveling control section 120 will control the mowing height drive section 147 according to such mowing height instruction.

For instance, in the automatic control mode, the traveling control section 120 will drive the mowing height operational tool 77 by the mowing height drive section 147 according to a mowing height operation instruction for the mowing height operational tool 77. In correspondence with driving of the mowing height operational tool 77, the mowing height adjustment link 117 operably coupled to the mowing height operational tool 77 will also be driven. With this, even with a work vehicle such as a grass mowing machine, adopting the arrangement of the mowing height operational tool 77 and the mowing height adjustment mechanism 97 being mechanically coupled to each other via the mowing height adjustment link 117, automatic control of the mowing height adjustment mechanism 97 is made possible.

Incidentally and alternatively, the mowing height drive section 147 may drive the mowing height adjustment link 117 for driving the mowing height adjustment mechanism 97, instead of driving the mowing height operational tool 77 according to a mowing height operation instruction.

Modified Embodiments of First Embodiment (1) In the foregoing embodiment, an explanation has been made with using a grass mowing machine called a mid-mount zero-turn mower as an example. However, the present invention is not limited to such mid-mount zero-turn mower, but can be applied also to a grass mowing machine with a mower deck being supported forwardly of the traveling machine body 10.

Further, the invention is not limited to grass mowing machines, but the invention can be applied to a work vehicle in which various operational tools and drive mechanisms are mechanically coupled with each other via links.

(2) In the foregoing embodiment, as examples of operational tools, the traveling levers, brake pedals, etc. were cited However, the operational tools are not limited to these, but can include various kinds of operational tools for driving various devices in a traveling device. In such case, the various operational tools and the various devices will be coupled to each other via links and operations from the various operational tools will be transmitted to the various devices via the links. Further, the levers described in the foregoing embodiment such as the traveling levers which are operated mainly by the driver's hand can be replaced by pedals. Conversely, the pedals such as the brake pedal to be operated by the driver's foot can be replaced by levers operable by a hand.

Moreover, the positions of the operational tools are not limited those disclosed in the foregoing embodiment. For instance, the accelerator lever 71 may be disposed on the left side of the driver's seat 53 and the other tools such as the brake pedal 191, etc. can be disposed at desired positions.

(3) In the foregoing embodiment, as an example of the grass mowing machine, a grass mowing machine called the zero-turn mower configured such that the left and right rear wheels 12 can be driven and controlled independently of each other was cited. However, the present invention is applicable also to a grass mowing machine in which the left and right rear wheels 12 are coupled via differential mechanisms with the front wheels 11 acting as steering wheels.

(4) In the foregoing embodiment, in the automatic control mode, the traveling control section 120 operate various kinds of operational tools according to instructions for such various kinds of operational tools. And, as the various operational tools are automatically operated according to instructions, various devices or various mechanisms etc. corresponding to the various operational tools will be driven automatically. However, alternatively, the traveling control section 120 may automatically drive the links which operably couple the various operational tools with the various devices or various mechanisms, etc. As the links are automatically driven, the various devices, various mechanisms, etc. corresponding to the links will be automatically driven.

(5) In the foregoing embodiment, the rear brakes 96 are provided in correspondence with the rear wheels 12. However, brakes may be provided in correspondence with both the rear wheels 12 and the front wheels 11 or front brakes may be provided in correspondence with the front wheels 11.

(6) In the specific embodiment described above, the mower unit 6 includes three blades. However, the unit may include two blades or four or mower blades instead.

Second Embodiment

[General Arrangement of Grass Mowing Machine]

Figure 4:
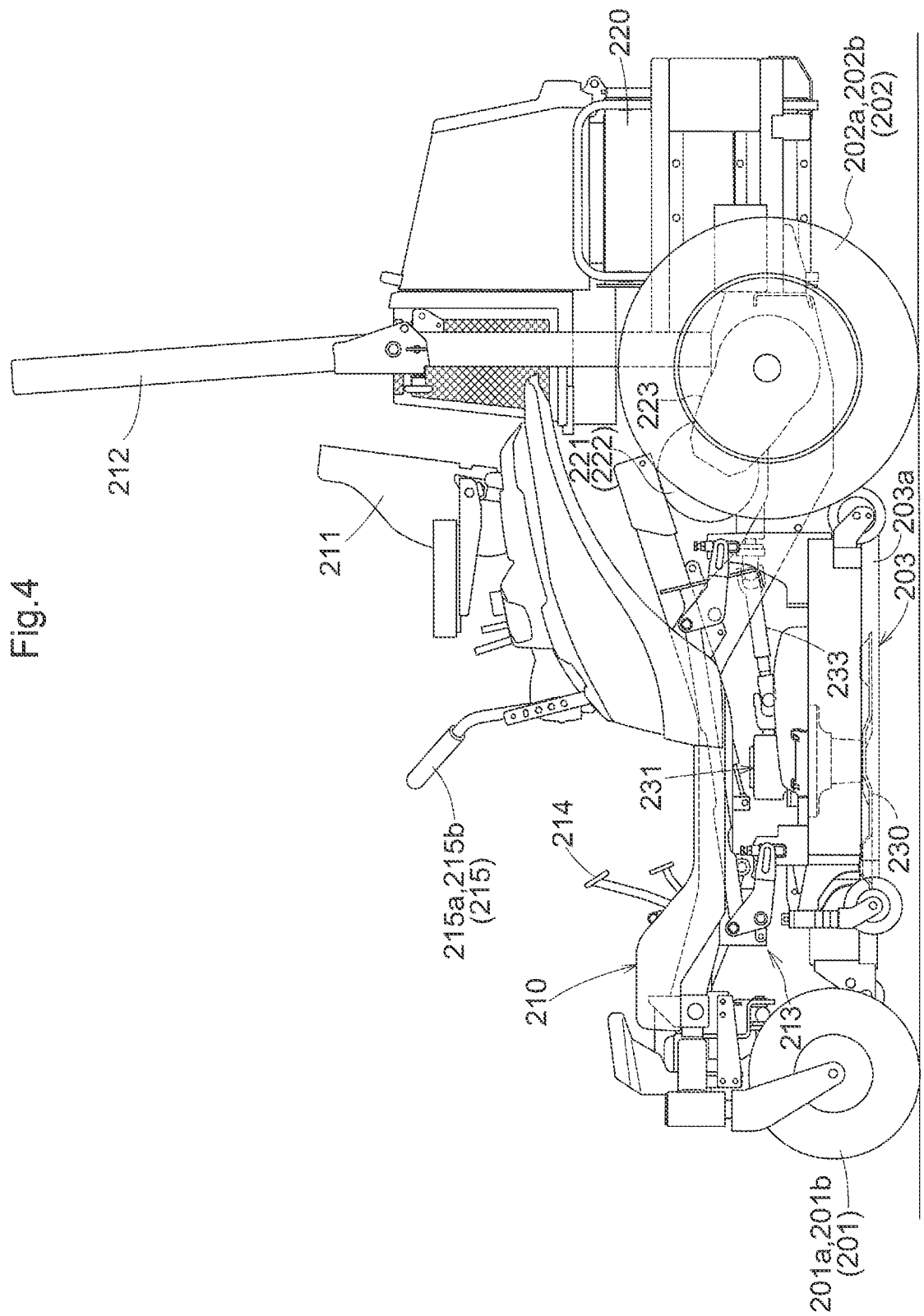
FIG. 4 is a view showing a second embodiment (applied also up to FIG. 11), which a side view showing a grass mowing machine.
Figure 5:
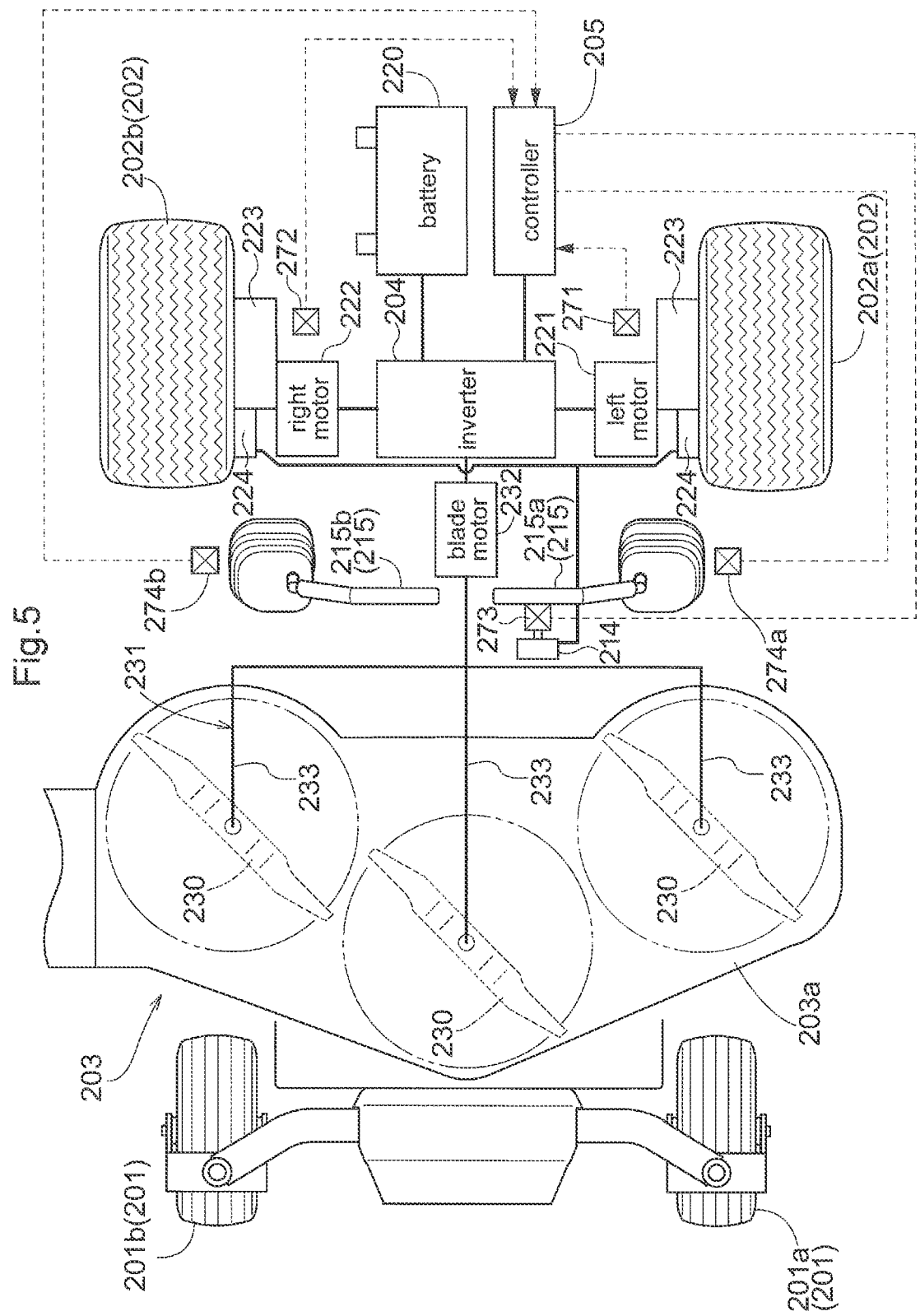
FIG. 5 is a system diagram showing an electric system and a power system of the grass mowing machine.

A specific embodiment of a grass mowing machine will be described next. In the instant embodiment, an electric work vehicle is provided as a riding electric grass mowing machine (to be referred to simply as "grass mowing machine" hereinafter) with a mower unit 203 mounted on a vehicle body, the vehicle being called a "zero-turn mower" also. FIG. 4 is a side view of the grass mowing machine. FIG. 5 schematically shows an electric system diagram and a power system diagram of the grass mowing machine.

This grass mowing machine includes a front wheel unit 201, a drive wheel unit 202 and a traveling vehicle body 210. The front wheel unit 201 includes a left front wheel 201*a* and a right front wheel 201*b*, with the left front wheel 201*a* and the right front wheel 201*b* being configured respectively as a freely rotatable caster type. The drive wheel unit 202 includes a left drive wheel 202*a* and a right drive wheel unit 202*b*. The traveling vehicle body 210 is supported by the front wheel unit 201 and the drive wheel unit 202.

At a rear portion of the traveling vehicle body 210, a battery 220 is disposed. A driver's seat 211 is disposed on more front side than the battery 220. Between the driver's seat 211 and the battery 220 in the front/rear direction, a ROPS (Roll-Over Protection System) frame 212 is mounted vertically. Downwardly of the traveling vehicle body 210 and in a space between the front wheel unit 201 and the drive wheel unit 202, a mower unit 203 is provided. This mower unit 203 is suspended from the traveling vehicle body 210 to be lifted up/down via an electric lift mechanism 213.

The drive wheel unit 202 is driven by traveling motors. As such traveling motors, a left motor 221 and a right motor 222 are provided. The left motor 221 rotatably drives the left drive wheel 202*a* and the right motor 222 rotatably drives the right drive wheel 202*b*. In the following discussion, when a language "traveling motor" is used, this collectively refers to the left motor 221 and the right motor 222.

The mower unit 203 includes a mower deck 203*a*, and a rotary type blade 230. The blade 230 is rotatably driven by a blade drive mechanism 231. This blade drive mechanism 231 includes an electric blade motor 232 and a blade power transmission mechanism 233. The blade power transmission mechanism 233 transmits power of the blade motor 232 to the blade 230.

Incidentally, in FIG. 5 there are provided three blades 230. However, only one blade 230 may be provided or a plurality thereof may be provided.

Though not shown, in the surrounding of the driver's seat 211, there are disposed a blade operational lever, a mower unit lift pedal, a mowing height adjustment dial for adjusting a mowing height, etc.

[Vehicle Speed Operational Tool]

As shown in FIG. 4 and FIG. 5, on the left and right opposed sides of the driver's seat 211, there are disposed a left maneuvering lever 215*a* and a right maneuvering lever 215*b*, the left maneuvering lever 215*a* and the right maneuvering lever 215*b* together constituting "vehicle speed operational tool 215". Each one of the left maneuvering lever 215*a* and the right maneuvering lever 215*b* is pivoted about a horizontal pivot axis extending in the vehicle body right/left direction. The left motor 221 can be driven by a front/rear operation of the left maneuvering lever 215*a*. The right motor 222 can be driven by a front/rear operation of the right maneuvering lever 215*b*.

The left maneuvering lever 215*a* and the right maneuvering lever 215*b* respectively are urged to be located at a position not driven by the left motor 221 and the right motor 222, namely, a neutral position N (see FIG. 7). And, the left maneuvering lever 215*a* and the right maneuvering lever 215*b* respectively allows for changes of its operational position in the front/rear direction in response to a driver's operation. Specifically, if the driver operates the left maneuvering lever 215*a* to more front side than the neutral position N, the left motor 221 is driven forwardly. If the driver operates the left maneuvering lever 215*a* to more rear side than the neutral position N, the left motor 221 is driven reversely. Similarly, if the driver pivotally operates the right maneuvering lever 215*b* to more front side than the neutral position N, the right motor 222 is driven forwardly; and if the driver operates the right maneuvering lever 215*b* to more rear side than the neutral position N, the right motor 222 is driven reversely. With these, the machine body of the grass mowing machine can travel.

The vehicle speed operational tool 215 is configured to be able to adjust the vehicle speed of the machine body. Specifically, of the pivotal range respectively of the left maneuvering lever 215*a* and the right maneuvering lever 215*b*, the region on the front side of the neutral position N is a forward traveling speed changing region F (see FIG. 7) capable of changing a forward traveling vehicle speed, which provides a higher vehicle speed as the lever is pivoted more forwardly. Further, of the pivotal range respectively of the left maneuvering lever 215*a* and the right maneuvering lever 215*b*, the region on the rear side of the neutral position N is a reverse traveling speed changing region R (see FIG. 7) capable of changing a reverse traveling vehicle speed, which provides a higher vehicle speed as the lever is pivoted more rearwardly. In this way, the vehicle speed operational tool 215 is operable over the forward traveling speed changing region F capable of changing the forward traveling vehicle speed, the reverse traveling speed changing region R capable of changing the reverse traveling vehicle speed and the neutral position N located between the forward traveling speed changing region F and the reverse traveling speed changing region R to be able to stop of the machine body.

The traveling motors receive electric power via an inverter 204. Rotational speeds of the left motor 221 and the right motor 222 can be changed independently of each other. So, it is possible to effect control for causing the rotational speeds of the left drive wheel 202*a* and the right drive wheel 202*b* to differ from each other. Thus, based on a speed difference between the left drive wheel 202*a* and the right drive wheel 202*b*, a turning of the grass mowing machine is effected. Incidentally, in the instant embodiment, between the left motor 221 and the left drive wheel 202*a*, a traveling drive mechanism 223 is provided. And, between the right motor 222 and the right drive wheel 202*b*, the traveling drive mechanism 223 is provided. Namely, the traveling drive mechanism 223 is provided for power transmission between the traveling motor and the drive wheel unit 202.

In the grass mowing machine, there are provided a left rotation detection sensor 271 capable of detecting a rotational speed of the left motor 221 and a right rotation detection sensor 272 capable of detecting a rotational speed of the right motor 222. Incidentally and alternatively, the left rotation detection sensor 271 may be configured to detect a rotational speed of the left drive wheel 202a and the right rotation detection sensor 272 may be configured to detect a rotational speed of the right drive wheel 202b.

[Brake Operational Tool and Brake Device]

As shown in FIG. 4 and FIG. 5, forwardly of the driver's seat 211, a stepping-on type brake pedal 214 is provided as a brake operational tool. and each one of the left drive wheel 202a and the right drive wheel 202b is provided with a mechanical type brake 224 as a "brake device" When the brake pedal 214 is stepped on, the brake 224 applies a braking action to the left drive wheel 202a and the right drive wheel 202b. The more the brake pedal 214 is stepped on, the stronger the braking action provided by the brake 224. In this way, the brake 224 as a brake device, is configured to be capable of applying a braking action to the drive wheel unit 202 according to an operation on the brake pedal 214 as a brake operational tool.

The braking action of the brake 224 can be detected by a brake detection sensor 273 as a "brake sensor". Further, there is provided a vehicle stop switch 292 (see FIG. 6) operable in association with an operation on the brake pedal 214, and this vehicle stop switch 292 is operated when the driver steps on the brake pedal 214 to the far side.

[Control System of Grass Mowing Machine]

FIG. 6 shows a functional block diagram of a control system of the grass mowing machine. Power supply operations to the left motor 221, the right motor 222 and the blade motor 232 are effected respectively via the inverter 204. And, control of this inverter 204 is effected by a controller 205. The rotational speed of the left motor 221 is detected by the left rotation detection sensor 271, and the rotational speed of the right motor 222 is detected by the right rotation detection sensor 272. Detection signals of the left rotation detection sensor 271 and the right rotation detection sensor 272 are inputted to the controller 205 via a sensor information processing section 205a.

As the manual operational devices, there are provided the brake pedal 214, the left maneuvering lever 215a, the right maneuvering lever 215b, the auto-cruising switch 291, the vehicle stop switch 292, etc. An operational position of the left maneuvering lever 215a is detected by a left maneuvering angle detection sensor 274a, and an operational position of the right maneuvering lever 215b is detected by a right maneuvering angle detection sensor 274b. Namely, the left maneuvering angle detection sensor 274a and the right maneuvering angle detection sensor 274b together constitute what is referred to as "operation detection section" in the context of the present invention. And, this operation detection section is configured to be capable of detecting operational positions of the vehicle speed operational tool 215.

Further, a stepped-on amount of the brake pedal 214 is detected by the brake detection sensor 273 as a brake sensor. Operation signals based on detections of these sensors (including the left maneuvering angle detection sensor 274a, the right maneuvering angle detection sensor 274b, and the brake detection sensor 273) and operation signals based on operations of the auto-cruising switch 291 and the vehicle stop switch 292 are inputted to the controller 205 via an operation input processing section 205b. The auto-cruising switch 291 and the vehicle stop switch 292 will be described later.

The controller 205 is the core component of the control system and this controller 205 includes a traveling mode management section 250, a storage section 251, a motor control unit 206 and a blade drive control section 252. These are realized substantially by execution of programs. However, if needed, they may be constituted of hardware also.

The sensor information processing section 205a processes signals inputted from the left rotation detection sensor 271, the right rotation detection sensor 272 and the brake detection sensor 273 and converts them into information usable within the controller 205. The operation input processing section 205b processes sensor signals inputted from the manual operation input devices (the brake pedal 214, the left maneuvering lever 215a, the right maneuvering lever 215b, the auto-cruising switch 291, the vehicle stop switch 292, etc.) and convert them into information usable within the controller 205. The traveling mode management section 250 and the storage section 251 will be described later. The controller 205 has an auto-cruising function capable of maintaining rotational speeds respectively of the left drive wheel 202a and the right drive wheel 202b constant even in the absence of any operations of the left maneuvering lever 215a and the right maneuvering lever 215b. The controller 205 has a plurality of traveling modes and includes an automatic traveling mode which enables the auto-cruising function.

The motor control unit 206 includes a left wheel speed calculation section 261, a right wheel speed calculation section 262 and a traveling control section 263. As an operational position of the left maneuvering lever 215a is detected by the left maneuvering angle detection sensor 274a, the left wheel speed calculation section 261 calculates a target rotational speed for the left motor 221 based on this operational position. Further, as an operational position of the right maneuvering lever 215b is detected by the right maneuvering angle detection sensor 274b, the right wheel speed calculation section 262 calculates a target rotational speed for the right motor 222 based on this operational position.

The inverter 204 includes a left wheel power supply section 241, a right wheel power supply section 242 and a blade power supply section 240, and this inverter 204 and the battery 220 are connected to each other. The blade drive control section 252 outputs a control signal to the blade power supply section 240, so that the blade power supply section 240 supplies electric power suitable for the blade motor 232 based on this control signal from the blade drive control section 252. The traveling control section 263 outputs control signals to the left wheel power supply section 241 and the right wheel power supply section 242 based on the target rotational speed of the left motor 221 and the target rotational speed of the right motor 222. The left wheel power supply section 241 supplies electric power suitable for the left motor 221 based on the control signal from the traveling control section 263. The right wheel power supply section 242 supplies electric power suitable for the right motor 222 based on the control signal from the traveling control section 263. In other words, the traveling control section 263 controls a rotational speed of the traveling motor based on an operational position of the vehicle speed operational tool 215.

FIG. 7 shows a graph showing relation between operational positions of the vehicle speed operational tools 215 and the rotational speeds of the traveling motor. In FIG. 7, there is shown the neutral position N of the vehicle speed operational tool 215. This neutral position N has a non-sensitive width. And, in the manual traveling mode, if the operational position of the vehicle speed operational tool 215 is located in the forward traveling speed changing region F, the traveling motors will be rotated forwardly, whereby the grass mowing machine travels forwardly. Further, in the manual traveling mode, if the operational position of the vehicle speed rotational tool 215 is located in the reverse traveling speed changing region R, the traveling motors will be rotated reversely, whereby the grass mowing machine travels reversely. In the example illustrated in FIG. 7, the maximum rotational speed at the time of forward rotation of the traveling motor is 3000 rpm and the maximum rotational speed at the time of reverse rotation of the traveling motor is 1100 rpm approximately. These maximum rotational speeds can be changed appropriately.

The motor control unit 206 effects control for speed decreasing of the traveling motor based on detection of an operation of the brake pedal 214 by the brake detection sensor 273. More particularly, a stepped-on amount of the brake pedal 214 is detected by the brake detection sensor 273 and the left wheel speed calculation section 261 calculates a limit rotational speed of the left motor 221, based on the stepped-on amount of the brake pedal 214. Similarly, the right wheel speed calculation section 262 calculates a limit rotational speed of the right motor 222 based on a stepped-on amount of the brake pedal 214. The left wheel speed calculation section 261 and the right wheel speed calculation section 262 respectively calculates target rotational speeds. If these target rotational speeds exceed the respective limit rotational speeds, the target rotational speeds will be limited to the respective limit rotational speeds.

In case the rotational speed of the traveling motor exceeds the limit rotational speed, then, based on the limit rotational speed of the traveling motor, the traveling control section 263 outputs control signals to the left wheel power supply section 241 and the right wheel power supply section 242, respectively, for regenerative braking control. Then, the left wheel power supply section 241 and the right wheel power supply section 242 respectively output regenerative powers to the left motor 221 and the right motor 222 for executing the regenerative braking control. Further, if the brake pedal 214 is stepped on significantly, this brake pedal 214 comes into contact with the vehicle stop switch 292, thus operating this vehicle stop switch 292. In this case, the invertor 204 stops power supply to the traveling motors.

FIG. 8 shows a graph illustrating relation between stepped-on amounts of the brake pedal 214 and the rotational speeds of the traveling motors. In the stepped-on amount of the brake pedal 214, the region between zero and an action starting stepped-on amount Bo is a non-sensitive region. Even if the brake pedal 214 is stepped on in this region, the brake 224 (see FIG. 5) applies no braking action to the left drive wheel 202a and the right drive wheel 202b. When the brake pedal 214 is stepped on to the action starting stepped-on amount Bo, the braking action of the brake 224 is started. Upon detection of the braking action of the brake 224, in accordance with the stepped-on amount of the brake pedal 214, the rotational speed of the traveling motor will be controlled to become below a rotational speed shown by a diagonal line in FIG. 8. The limit rotational speed of the traveling motor varies in direct proportion from the action starting stepped-on amount Bo and the stepped-on amount where the vehicle stop switch 292 is operated. If the rotational speed of the traveling motor exceeds the limit rotational speed, the traveling motor will be reduced by the regenerative braking control. And, the rotational speed of the traveling motor will be reduced by the regenerative braking control and the braking action of the brake 224. The regenerative braking control serves to suppress wasteful output of the traveling motor when the brake pedal 214 is stepped on.

[Automatic Traveling Mode]

Explanation on the automatic traveling mode will be given next based on FIG. 6 and FIG. 7 illustrations. As described above, the controller 205 includes a plurality of traveling modes, which include the automatic traveling mode as a mode enabling the auto-cruising function. The traveling modes of the controller 205 are managed by the traveling mode management section 250. The storage section 251 is configured to store drive states of the machine body. The traveling mode management section 250 is configured to be capable of switching over the traveling mode of the controller 205 between the automatic traveling mode in which the traveling control section 263 controls the rotational speed of the traveling motor based on a drive state stored in the storage section 251 and the manual traveling mode in which the traveling control section 263 controls the rotational speed of the traveling motor based on an operational position provided by a manual operation of the vehicle speed operational tool 215.

If the auto-cruising switch 291 is operated in the course of mowing work traveling state, a drive state of the machine body is stored by the storage section 251 and this storage section 251 stores a certain position in the forward traveling speed changing region F of the vehicle speed operational tool 215 as such drive state of the machine body. In the instant embodiment, an operational position of the vehicle speed operational tool 215 when the auto-cruising switch 291 is operated is stored as such drive state of the machine body in the storage section 251. In the following discussion, the operational position of the vehicle speed operational tool 215 stored in the storage section 251 will be referred to as "stored position Fm". After storing of the stored position Fm by the storage section 251, the traveling mode of the controller 205 is switched over to the automatic traveling mode. And, based on this stored position Fm, the motor control unit 206 controls the rotational speed of the traveling motor. In the case of the example illustrated in FIG. 7, the control by the motor control unit 206 is effected such that the rotational speed of the traveling motor may become 1000 rpm, based on the stored position Fm.

As described above, when the auto-cruising switch 291 is operated, the traveling mode of the controller 205 is switched over to the automatic traveling mode. It is noted however that the operation of the auto-cruising switch 291 alone does not provide the switchover of the traveling mode of the controller 205 to the automatic traveling mode. Rather, certain conditions that allow switchover to the automatic traveling mode will be determined by the traveling mode management section 250. Detailed explanation of this will be given next.

Figure 9:
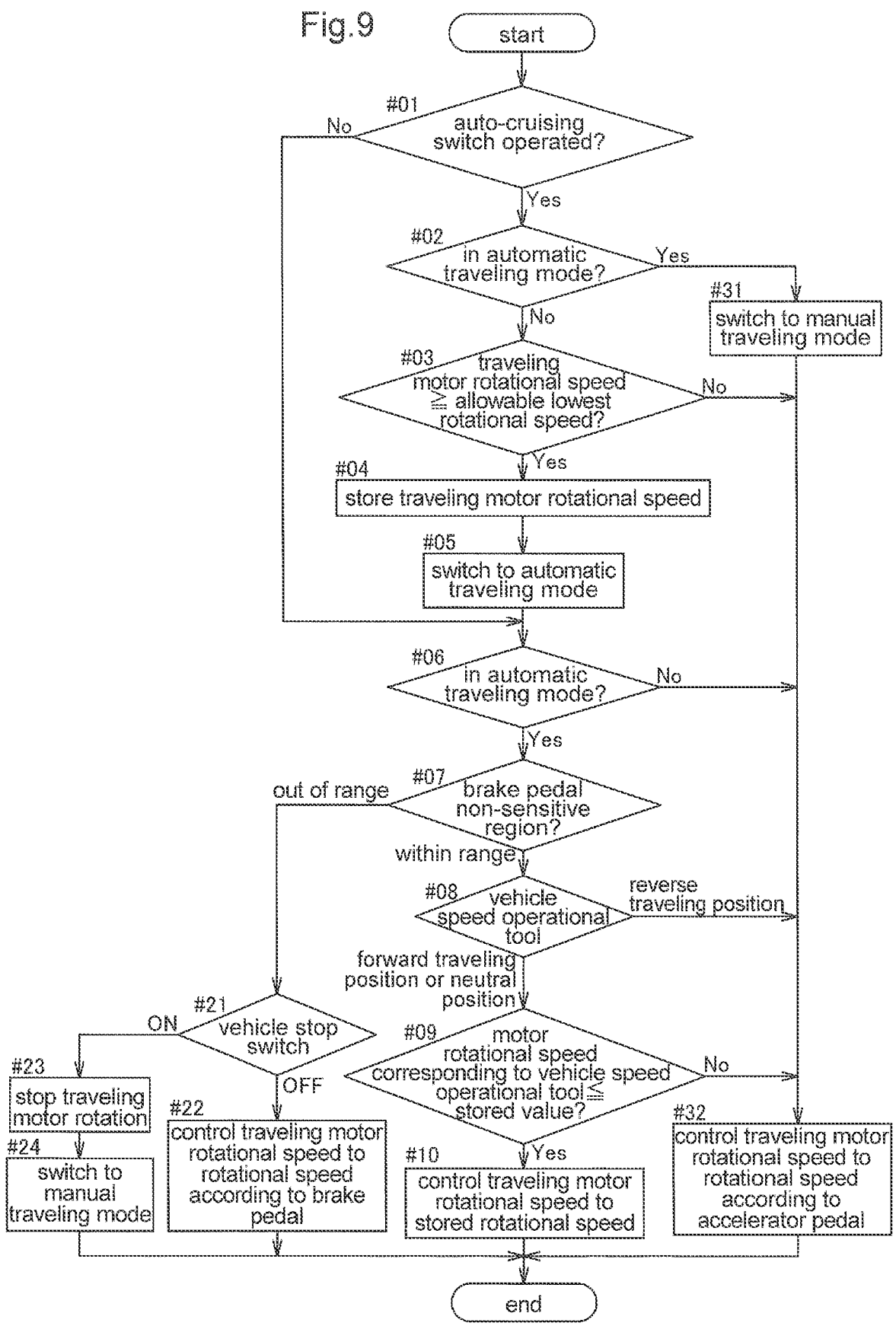
FIG. 9 is a flowchart illustrating processing of an auto cruising function.

FIG. 9 shows a flow of processing for the automatic traveling mode. Next, explanation of this processing flow will be given based on FIGS. 6 through 9. First, the process determines whether the auto-cruising switch 291 has been operated or not (step #01). If it is determined that the auto-cruising switch 291 has not been operated (step #01: NO), then, the process goes to step #06 which will be described later. On the other hand, if it is determined that the auto-cruising switch 291 has been operated (step #01: YES), then, the process proceeds to determine whether the current traveling mode of the controller 205 is the automatic traveling mode or not (step #02). Since this auto-cruising switch 291 is used also as a switch for releasing the auto-cruising function, if it is determined that the current mode is the automatic traveling mode (step #02: YES), the traveling mode management section 250 switches the traveling mode of the controller 205 from the automatic traveling mode to the manual traveling mode (step #31).

If it is determined that the current traveling mode of the controller 205 is a mode other than the automatic traveling mode (step #02: NO), then, the process goes on to determine whether the rotational speed of the traveling motor exceeds the allowable lowest rotational speed or not (step #03). Such allowable lowest rotational speed can be e.g. 100 rpm, and this value can be changed if needed. If the rotational speed of the traveling motor falls short of the allowable lowest rotational speed (step #03: NO), the conditions for enabling switchover to the automatic traveling state are not satisfied; then, switchover to the automatic traveling mode is not effected, but the process goes to step #32 to be described later.

In case straight traveling state of the grass mowing machine is desired in the automatic traveling mode, it may be arranged such that switchover to the automatic traveling mode is allowed if a difference between detection values respectively of the left rotation detection sensor 271 and the right rotation detection sensor 272 is below a preset threshold value. Further, determination of overload on the traveling motor, determination of overload on the blade motor 232, determination of overheating of the inverter 204, determination of abnormality by the left rotation detection sensor 271 and the right rotation detection sensor 272, determination of abnormality by the left maneuvering angle detection sensor 274a and the right maneuvering angle detection sensor 274b, etc. can also be included in such conditions that allow the switchover to the automatic traveling mode. And, it may be arranged such that unless these conditions are satisfied, the switchover to the automatic traveling mode is not effected, but the process goes to step #32 which will be described later.

On the other hand, if the rotational speed of the traveling motor exceeds the allowable lowest rotational speed (step #03: YES), the process stores the rotational speeds of the left motor 221 and the right motor 222 (step #04). Specifically, detection values respectively of the left rotation detection sensor 271 and the right rotation detection sensor 272 at the time of the operation of the auto-cruising switch 291 will be stored in the storage section 251 as stored values Fm such as those shown in FIG. 7. And, the traveling management section 250 allows switchover to the automatic traveling mode, whereby the traveling mode of the controller 205 is switched over to the automatic traveling mode (step #05).

If such switchover to the automatic traveling mode was not effected (step #03: NO) or the mode is currently the manual traveling mode (step #31, or step #06: NO), control of the traveling motor based on the manual traveling mode will be effected. Namely, as indicated by the on-dot chai line of the manual traveling mode in FIG. 7, the rotational speed of the traveling motor will be controlled to be rotational speed according to the original operational position of the vehicle speed operational tool 215 (step #32).

If the traveling mode of the controller 205 is currently the automatic traveling mode (step #06: YES), the process then determines whether the stepped-on amount of the brake pedal 214 is in the non-sensitive range or not (see FIG. 8) (step #07). If it is determined that the stepped-on amount of the brake pedal 214 is within the non-sensitive range (step #07: within the range), then, the process determines the position of the vehicle speed operational tool 215 (step #08).

Referring to FIG. 6, FIG. 7 and FIG. 9, if the operational position of the vehicle speed operational tool 215 is either at any chosen position in the forward traveling speed changing region F or the neutral position N (step #08: forward traveling position or neutral position), then, the process proceeds to determine whether this operational position is within the range of the neutral position N and the stored position Fm (step #09). And, if the operational position is within the range of the neutral position N and the stored position Fm (step #09: YES), the rotational speed of the traveling motor will be controlled such that the traveling speed of the grass mowing machine may be maintained constant based on the stored position Fm (step #10). Namely, when the traveling mode of the controller 205 is currently the automatic traveling mode, if the vehicle speed operational tool 215 is operated between the neutral position N and the stored position Fm, the traveling control section 263 will control the rotational speed of the traveling motor based on the stored position Fm. With this, the speed of the grass mowing machine will be maintained constant.

If the operational position of the vehicle speed operational tool 215 is operated largely to the forward traveling side than the stored position Fm, in the forward traveling speed changing region F (step #09: NO), the rotational speed of the traveling motor will be controlled according to this actual operational position. Namely, if the vehicle speed operational tool 215 is operated to more acceleration side than the stored position Fm, the traveling control section 263 will control the rotational speed of the traveling motor based on the operational position provided by the manual operation on the vehicle speed operational tool 215. With this, the driver can made adjustment of increasing the vehicle speed of the machine body even during the auto-cruising state of the grass mowing machine.

In case the operational position of the vehicle speed operational tool 215 is at any chosen position in the reverse traveling speed changing region R (step #08: reverse position), the rotational speed of the traveling motor will be controlled to a rotational speed according to the operational position of the vehicle speed operational tool 215 (step #32). In this, as shown by the solid line representing the automatic traveling mode in FIG. 7, if the vehicle speed operational tool 215 is operated in the reverse traveling speed changing region R, the rotational position of the traveling motor will vary in direct proportion between the rotational speed corresponding to the stored position Fm and the maximum rotational speed on the reverse rotation side of the motor. Thus, within the range of the reverse traveling speed changing region R, in correspondence with the proportional change of the rotational speed of the traveling motor, the stop position Rs will be calculated. That is, the stop position Rs for stopping the machine body will be set at a chosen position in the reverse traveling speed changing region R, in the automatic traveling mode.

Between the neutral position N and the stop position Rs, the closer the operational position of the vehicle speed operational tool 215 to the side of the stop position Rs, the lower the rotational speed of the traveling motor. And, when the operational position of the vehicle speed operational tool 215 is located at the stop position Rs, the traveling motor will be stopped, thus stopping the machine body. Also, if the vehicle speed operational tool 215 is operated to more reverse side than the stop position Rs, the rotation of the traveling motor will be reversed. And, the more the vehicle speed operational tool 215 is operated to the reverse side, the higher the rotational speed on the reverse rotation side of the traveling motor. In this way, as the vehicle speed operational tool 215 moves closer to the stop position Rs as this vehicle speed operational tool 215 is operated between the neutral position N and the stop position Rs, the traveling control section 263 will control to decrease the rotational speed of the traveling motor. Further, when the vehicle speed operational tool 215 is operated to the opposite side to the neutral position N than the stop position Rs, the traveling control section 263 will control to reverse the rotational direction of the traveling motor to the opposite side to the rotational direction based on the forward traveling speed changing region F. With this, even in a situation where forward traveling and reverse traveling of the machine body are effected frequently, speed reducing adjustment of the vehicle speed or reverse traveling by a manual operation are possible, with keeping the automatic traveling mode. Further, when the operational position of the vehicle speed operational tool 215 is returned to the neutral position N, the rotational speed of the traveling motor will be returned to the rotational speed based on the stored position Fm.

If it is determined that the stepped-on amount of the brake pedal 214 is out of the non-sensitive range (step #07: out of range), then, the process determines whether the vehicle stop switch 292 has been operated in association with the stepping-on of the brake pedal 214 or not (step #21). Referring to FIG. 6, FIG. 8 and FIG. 9, if it is determined that no operation of the vehicle stop switch 292 took place (step #21: OFF), then, the rotational speed of the traveling motor will be controlled to become the rotational speed according to the stepped-on amount of the brake pedal 214 (step #22). More particularly, the rotational speed of the traveling motor will be controlled to become lower than or equal to the rotational speed corresponding to the stepped-on amount as indicated by the solid line of the automatic traveling mode shown in FIG. 8. In this way, when the brake pedal 214 is stepped on by a small amount, the vehicle speed of the grass mowing machine will be finely adjusted and the automatic traveling mode will be contained at the same time.

On the other hand, if an operation on the vehicle stop switch 292 took place (step #21: ON), then, the traveling motor will be stopped (step #23) and the traveling mode of the controller 205 will be switched over from the automatic traveling mode to the manual traveling mode (step #24). Namely, when the brake pedal 214 is largely stepped on, the grass mowing machine will be stopped and also the auto-cruising function will be released. In this way, when the traveling mode of the controller 205 is set to the automatic traveling mode, the traveling mode management section 250 will switch over the traveling mode of the controller 205 to the manual traveling mode if the brake pedal 214 as a brake operational tool is operated by an amount greater than the preset operational amount. Based on this preset operational amount, the operational amount by which the vehicle stop switch 292 is to be operated will be set; and if the brake pedal 214 is operated by an amount greater than this set amount, the vehicle stop switch 292 will be operated. Thus, the traveling mode management section 250 will switchover the traveling mode of the controller 205 to the manual traveling mode in response to an operation on the vehicle stop switch 292.

Modified Embodiments of Second Embodiment

The present invention is not limited to the arrangements disclosed in the foregoing embodiment. Next, some representative modified embodiments of the present invention will be shown respectively.

(1) In the foregoing embodiment, the respective powers of the left motor 221 and the right motor 222 are transmitted respectively to the left drive wheel 202a and the right drive wheel 202b via the traveling drive mechanism 223. However, the traveling drive mechanism 223 may be omitted. For instance, the left motor 221 and the right motor 222 respectively may be configured as a direct drive type motor. Further alternatively, these may be configured as an in-wheel type motors mounted respectively to the left drive wheel 202a and the right drive wheel 202b.

Figure 10:
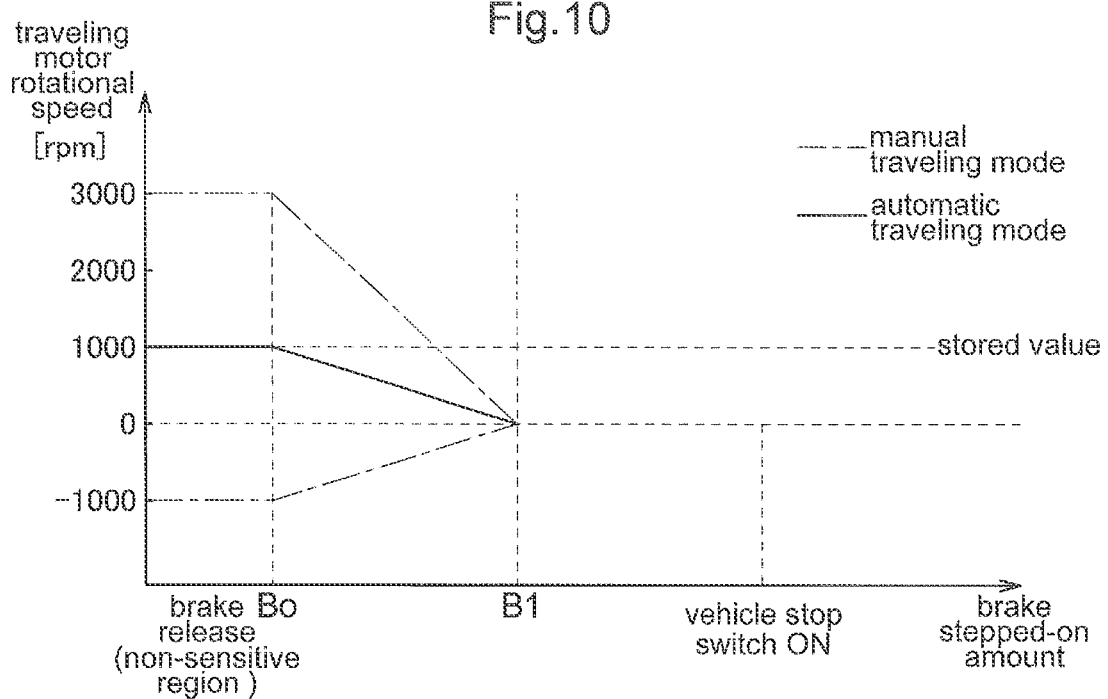
FIG. 10 is a graph showing relation between a stepped-on amount of a brake pedal and a rotational speed of a traveling motor, as a further embodiment of the second embodiment.

(2) In the foregoing embodiment, as the set operational amount of the brake pedal 214, the operational amount by which the vehicle stop switch 292 is operated is set and when the brake pedal 214 is operated by an amount greater than this set operational amount, the vehicle stop switch 292 is operated. Then, the traveling mode management section 250 switches over the traveling mode of the controller 205 to the manual traveling mode, based on the operation of the vehicle stop switch 292. However, the invention is not limited to such embodiment. For instance, as shown in FIG. 10, as the set operational amount of the brake pedal 214 which triggers the traveling mode management section 250 to switch over the traveling mode to the manual traveling mode, a switchover stepped-on amount B1 as a chosen stepped-on amount of the brake 224 may be set. In this case, as shown in FIG. 10, it may be arranged such that the limit rotational speed of the traveling motor may vary in direct proportion between an action starting stepped-on amount Bo and a switchover stepped-on amount B1. Further, instead of the arrangement of detecting a stepped-on amount of the brake pedal 214, it is possible to employ e.g. an arrangement that the brake detection sensor 273 detects an action of a brake pad (not shown) or a brake shoe (not shown) provided in the brake 224. Namely, it is possible to configure such that in the automatic traveling mode, the traveling mode management section 250 switches over to the manual traveling mode when the brake detection sensor 273 as a brake sensor detects a braking action.

Figure 11:
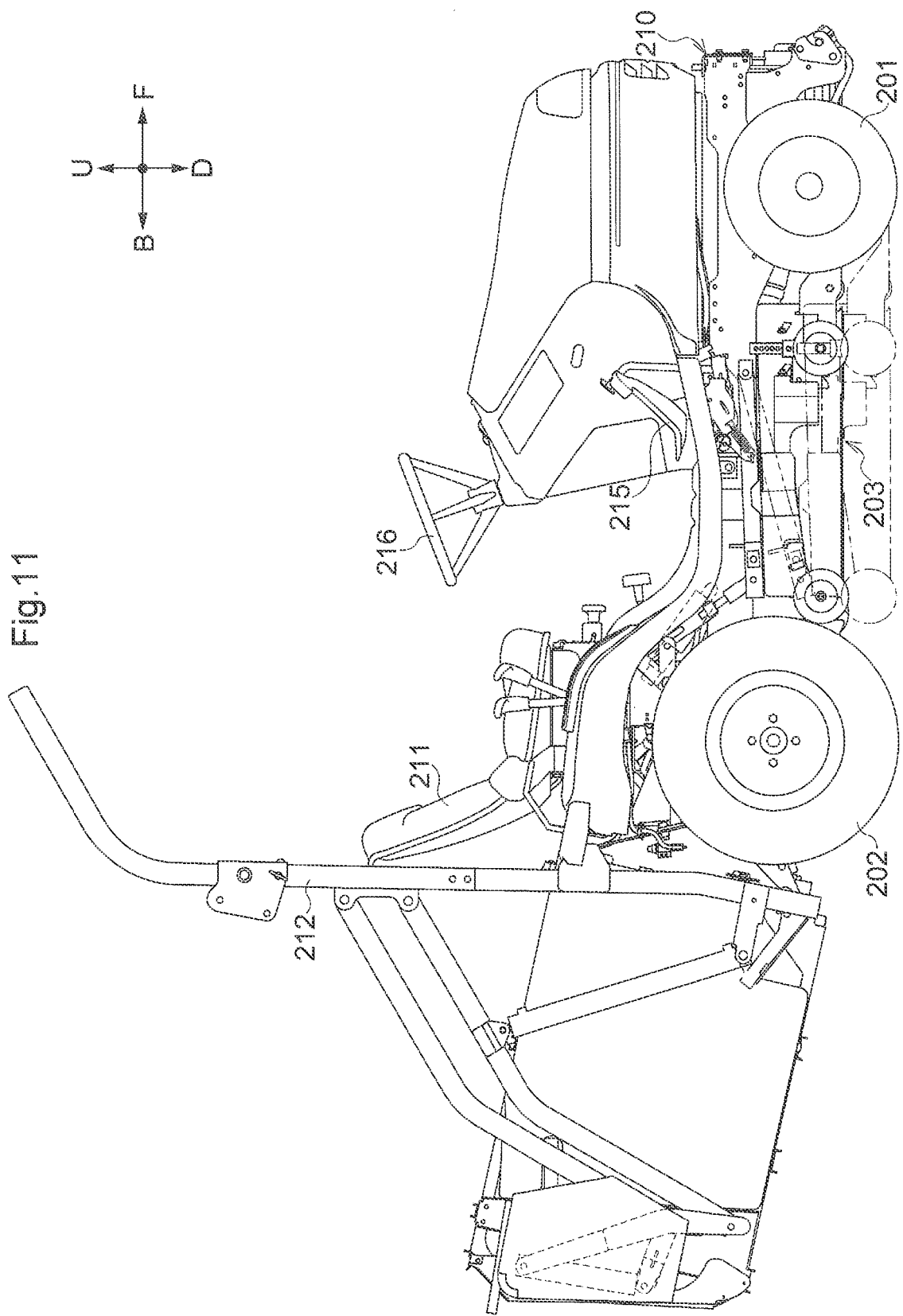
FIG. 11 is a side view of a grass mowing machine shown as a further embodiment of the second embodiment.

(3) In the foregoing embodiment, a so-called zero-turn mower was shown as an example of the grass mowing machine relating to the embodiment. However, the present invention is applicable also to a steering wheel-maneuvering type riding type grass mowing machine as shown in FIG. 11 for instance. In this, a steering wheel 216 is provided forwardly of the driver's seat 211. When the steering wheel 216 is operated, the front wheel unit 201 is maneuvered, thus making a turn of the traveling vehicle body 210 possible. Further, the vehicle speed operational tool 215 may be configured as a stepped-on type accelerator pedal. In this case, the vehicle speed operational tool 215 may be configured such that if it is stepped on to the front side of the machine body, the machine body travels forwardly and that when it is stepped on to the rear side of the machine body, the machine body travels in reverse. And, the left maneuvering lever 215a and the right maneuvering lever 215b shown in FIG. 6 may be integrated together. Also, the left maneuvering angle detection sensor 274a and the right maneuvering angle detection sensor 274b shown in FIG. 6 may be integrated together also.

(4) In the foregoing embodiment, the traveling mode management section 250 switches over the traveling mode of the controller 205 to the manual traveling mode in response to an operation on the vehicle stop switch 292. However, the invention is not limited to this embodiment. For instance, the traveling mode management section 250 may be configured to switch over the traveling mode of the controller 205 to the manual traveling mode in response to an operation on the unillustrated blade operational lever or mower unit lift pedal, rather than the vehicle stop switch 292.

(5) In the foregoing embodiment, the storage section 251 is configured to store the stored position Fm as a drive state of the machine body. However, the invention is not limited to this embodiment. For instance, the storage section 251 may be configured to store a rotational speed of the traveling motor when the auto-cruising switch 291 is operated. Namely, any configuration may be adopted as long as in the automatic traveling mode, the traveling control section 263 controls the rotational speed of the traveling motor based on a drive state of the machine body stored in the storage section 251.

(6) In the foregoing embodiment, the grass mowing machine was configured as a fully electrically driven type. Instead, it is also possible to employ a hybrid type which uses both a traveling motor and an internal combustion engine for traveling of the grass mowing machine.

(7) The present invention is applicable to a riding type grass mowing machine (vehicle).

In the meantime, the arrangements disclosed in the foregoing embodiment (including the further embodiments) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

DESCRIPTION OF SIGNS 51a, 51b: traveling lever
81a, 81b: HST
101a, 101b: traveling link
131a, 131b: traveling drive section
120: traveling control section
202: drive wheel unit
202a: left drive wheel (drive wheel unit)
202b: right drive wheel (drive wheel unit)
214: brake pedal (brake operational tool)
215: vehicle speed operational tool
215a: left maneuvering lever (vehicle speed operational tool)
215b: right maneuvering lever (vehicle speed operational tool)
221: left motor (traveling motor)
222: right motor (traveling motor)
224: brake (brake device)
250: traveling mode management section
251: storage section
263: traveling control section
273: brake detection sensor
274a: left maneuvering angle detection sensor (operation detection section)
274b: right maneuvering angle detection sensor (operation detection section)
292: vehicle stop switch
F: forward traveling speed changing region
Fm: stored position
N: neutral position
R: reverse traveling speed changing region
Rs: stop position

The invention claimed is:

1. A work vehicle comprising:
a traveling vehicle body including a pair of left and right front wheels and a pair of left and right rear wheels;
a left stepless speed changer device configured to supply power to at least either one of the front wheel and the rear wheel which are disposed on the left side of the traveling vehicle body;
a right stepless speed changer device configured to supply power to at least either one of the front wheel and the rear wheel which are disposed on the right side of the traveling vehicle body;
a left traveling operational tool for operating driving of at least either one of the front wheel and the rear wheel which are disposed on the left side of the traveling vehicle body;
a right traveling operational tool for operating driving of at least either one of the front wheel and the rear wheel which are disposed on the right side of the traveling vehicle body;
a left traveling link configured to mechanically connect the left traveling operational tool with the left stepless speed changer device in order to transmit an operation of the left traveling operational tool to the left stepless speed changer device;
a right traveling link configured to mechanically connect the right traveling operational tool with the right stepless speed changer device in order to transmit an operation of the right traveling operational tool to the right stepless speed changer device;
a left traveling drive section for driving at least one of the left traveling operational tool and the left traveling link;
a right traveling drive section for driving at least one of the right traveling operational tool and the right traveling link; and
a traveling control section configured to activate the left traveling drive section in response to receipt of a left traveling instruction for the left traveling operational tool and to activate the right traveling drive section in response to receipt of a right traveling instruction for the right traveling operational tool, in an automatic control mode for automatically controlling the traveling vehicle body.

2. The work vehicle of claim 1, wherein in the automatic control mode, if the traveling control section receives a left neutral instruction for setting or releasing the left traveling operational tool to/from a neutral position, the traveling control section causes the left traveling operational tool to activate the left traveling drive section in response to the left neutral instruction; and if the traveling control section receives a right neutral instruction for setting or releasing the right traveling operational tool to/from a neutral position, the traveling control section causes the right traveling operational tool to activate the right traveling drive section in response to the right neutral instruction.

3. The work vehicle of claim 1, further comprising:
an engine;
an accelerator operational tool for operating a rotational speed of the engine;
an accelerator link for operably connecting the accelerator operational tool to the engine in order to transmit an operation of the accelerator operational tool to the engine; and an accelerator drive section for driving at least one of the accelerator operational tool and the accelerator link; and wherein in the automatic control mode, if the traveling control section receives a rotational speed adjusting instruction for the accelerator operational tool, the traveling control section activates the accelerator drive section.

4. The work vehicle of claim 1, further comprising:

a mower unit for mowing grass;

a mower lift operational tool for operating lifting up/down of the mower unit;

a mower lift mechanism for lifting up/down the mower unit in response to an operation of the mower lift operational tool;

a mower lift link for operably connecting the mower lift operational tool to the mower lift mechanism; and a mower lift drive section for driving either the mower lift operational tool or the mower lift link;

wherein in the automatic control mode, the traveling control section activates the mower lift drive section in response to a mower lifting-up instruction or a mower lifting-down instruction for the mower lift operational tool.

5. The work vehicle of claim 1, further comprising:

a mowing height operational tool for operating adjustment of a mowing height of grass to be mowed by the mower unit;

a mowing height adjustment mechanism for lifting up/down the mower unit in response to an operation of the mowing height operational tool;

a mowing height adjustment link for operably connecting the mowing height operational tool to the mowing height adjustment mechanism in order to transmit the operation of the mowing height operational tool to the moving height adjustment mechanism; and a mowing height drive section for driving at least one of the mowing height operational tool and the mowing height adjustment link;

wherein in the automatic control mode, the traveling control section activates the mowing height drive section in response to a mowing height operation instruction for the mowing height operational tool.

6. A work vehicle comprising:

a traveling vehicle body including a pair of left and right front wheels and a pair of left and right rear wheels;

a left stepless speed changer device configured to supply power to at least either one of the front wheel and the rear wheel which are disposed on the left side of the traveling vehicle body;

a right stepless speed changer device configured to supply power to at least either one of the front wheel and the rear wheel which are disposed on the right side of the traveling vehicle body;

a left traveling operational tool for operating driving of at least either one of the front wheel and the rear wheel which are disposed on the left side of the traveling vehicle body;

a right traveling operational tool for operating driving of at least either one of the front wheel and the rear wheel which are disposed on the right side of the traveling vehicle body:

a left traveling link configured to connect the left traveling operational tool with the left stepless speed changer device in order to transmit an operation of the left traveling operational tool to the left stepless speed changer device;

a right traveling link configured to connect the right traveling operational tool with the right stepless speed changer device in order to transmit an operation of the right traveling operational tool to the right stepless speed changer device;

a left traveling drive section for driving at least one of the left traveling operational tool and the left traveling link;

a right traveling drive section for driving at least one of the right traveling operational tool and the right traveling link;

a traveling control section configured to activate the left traveling drive section in response to receipt of a left traveling instruction for the left traveling operational tool and to activate the right traveling drive section in response to receipt of a right traveling instruction for the right traveling operational tool, in an automatic control mode for automatically controlling the traveling vehicle body;

a PTO shaft for taking off power from the engine;

a PTO clutch for engaging/disengaging the power transmitted from the engine to the PTO shaft;

a PTO operational tool for operating the PTO clutch;

a PTO link for operably connecting the PTO operational tool to the PTO clutch for transmitting an operation of the PTO operational tool to the PTO link; and a PTO drive section for driving at least one of the PTO operational tool and the PTO link;

wherein in the automatic control mode, if the traveling control section receives an engaging/disengaging instruction for the PTO operational tool, the traveling control section activates the PTO drive section.

7. A work vehicle comprising:

a traveling vehicle body including a pair of left and right front wheels and a pair of left and right rear wheels;

a left stepless speed changer device configured to supply power to at least either one of the front wheel and the rear wheel which are disposed on the left side of the traveling vehicle body;

a right stepless speed changer device configured to supply power to at least either one of the front wheel and the rear wheel which are disposed on the right side of the traveling vehicle body;

a left traveling operational tool for operating driving of at least either one of the front wheel and the rear wheel which are disposed on the left side of the traveling vehicle body;

a right traveling operational tool for operating driving of at least either one of the front wheel and the rear wheel which are disposed on the right side of the traveling vehicle body;

a left traveling link configured to connect the left traveling operational tool with the left stepless speed changer device in order to transmit an operation of the left traveling operational tool to the left stepless speed changer device;

a right traveling link configured to connect the right traveling operational tool with the right stepless speed changer device in order to transmit an operation of the right traveling operational tool to the right stepless speed changer device;

a left traveling drive section for driving at least one of the left traveling operational tool and the left traveling link;

a right traveling drive section for driving at least one of the right traveling operational tool and the right traveling link;

a traveling control section configured to activate the left traveling drive section in response to receipt of a left traveling instruction for the left traveling operational tool and to activate the right traveling drive section in response to receipt of a right traveling instruction for the right traveling operational tool, in an automatic control mode for automatically controlling the traveling vehicle body;

a brake for stopping driving of at least one of the front wheel and the rear wheel;

a brake operational tool for operating the brake;

a brake link for operably connecting the brake operational tool to the brake for transmitting an operation of the brake operational tool to the brake;

a brake drive section for driving at least one of the brake operational tool and the brake link;

a brake lock section for locking the brake operational tool when the brake is operated;

a brake lock operational tool for operating locking or lock-releasing of the brake operational tool by the brake lock section; and a brake lock drive section for driving the brake lock section;

wherein in the automatic control mode, if the traveling control section receives a braking instruction for the brake operational tool, the traveling control section activates the brake drive section, and in the automatic control mode, if the traveling control section receives a locking instruction for locking the brake operational tool, the traveling control section activates the brake lock drive section for causing the brake lock section to lock the brake operational tool; and if the traveling control section receives a lock releasing instruction for releasing locking of the brake operational tool, the traveling control section activates the brake lock drive section for causing the brake lock section to release locking of the brake operational tool.

* * * * *

UNITED STATES PATENT AND TRADEMARK OFFICE
CERTIFICATE OF CORRECTION

PATENT NO. : 12,268,122 B2  
APPLICATION NO. : 18/582304  
DATED : April 8, 2025  
INVENTOR(S) : Kazuaki Matsuda Page 1 of 1

It is certified that error appears in the above-identified patent and that said Letters Patent is hereby corrected as shown below:

In the Claims

Column 31, Line 62, Claim 6, delete "body:" and insert -- body; --

Signed and Sealed this  
Eighth Day of July, 2025

Coke Morgan Stewart  
*Acting Director of the United States Patent and Trademark Office*